(12) United States Patent
Okada et al.

(10) Patent No.: US 11,355,752 B2
(45) Date of Patent: Jun. 7, 2022

(54) POSITIVE ELECTRODE ACTIVE SUBSTANCE FOR NON-AQUEOUS SECONDARY BATTERY AND NON-AQUEOUS SECONDARY BATTERY INCLUDING THE SAME

(71) Applicant: MURATA MANUFACTURING CO., LTD., Kyoto (JP)

(72) Inventors: Shigeto Okada, Fukuoka (JP); Ayuko Kitajou, Fukuoka (JP)

(73) Assignee: Murata Manufacturing Co., Ltd., Kyoto (JP)

(*) Notice: Subject to any disclaimer, the term of this patent is extended or adjusted under 35 U.S.C. 154(b) by 274 days.

(21) Appl. No.: 16/723,353

(22) Filed: Dec. 20, 2019

(65) Prior Publication Data

US 2020/0243857 A1 Jul. 30, 2020

Related U.S. Application Data

(63) Continuation of application No. PCT/JP2018/024386, filed on Jun. 27, 2018.

(30) Foreign Application Priority Data

Jun. 30, 2017 (JP) .............................. JP2017-129338

(51) Int. Cl.
*H01M 4/00* (2006.01)
*H01M 4/505* (2010.01)
(Continued)

(52) U.S. Cl.
CPC ........... *H01M 4/505* (2013.01); *H01M 4/134* (2013.01); *H01M 4/1393* (2013.01);
(Continued)

(58) Field of Classification Search
CPC ...... H01M 4/525; H01M 4/62; H01M 10/052; H01M 4/582; C03C 3/21; C03C 14/006
See application file for complete search history.

(56) References Cited

U.S. PATENT DOCUMENTS 6,650,000 B2 * 11/2003 Ballantine ........... H01M 10/052
257/551
2013/0015410 A1 1/2013 Hashiba et al.
(Continued)

FOREIGN PATENT DOCUMENTS

CN 1026859761 1/2013
CN 104332609 2/2015
(Continued)

OTHER PUBLICATIONS

European Search Report dated Mar. 19, 2021 in corresponding European Application No. 18823220.1.
(Continued)

*Primary Examiner* — Cynthia H Kelly
*Assistant Examiner* — Monique M Wills
(74) *Attorney, Agent, or Firm* — K&L Gates LLP

(57) ABSTRACT

A positive electrode active substance for the non-aqueous secondary battery is provided. The positive electrode active substance includes a metal or a metal compound including the metal element $M^1$ exhibiting a conversion reaction and/or a reverse conversion reaction, and an amorphous metal oxide of the metal element $M^2$. $M^2$ includes at least one metal element selected from the group consisting of V, Cr, Mo, Mn, Ti, and Ni.

10 Claims, 16 Drawing Sheets

(51) Int. Cl.
  *H01M 4/134* (2010.01)
  *H01M 4/1393* (2010.01)
  *H01M 4/525* (2010.01)
  *H01M 4/02* (2006.01)

(52) U.S. Cl.
  CPC ...... *H01M 4/525* (2013.01); *H01M 2004/027* (2013.01); *H01M 2004/028* (2013.01)

(56) References Cited

U.S. PATENT DOCUMENTS

| | | | | |
|---|---|---|---|---|
| 2014/0170493 | A1* | 6/2014 | Holme | H01M 4/0428 |
| | | | | 429/220 |
| 2015/0236348 | A1 | 8/2015 | Aoyagi et al. | |
| 2017/0179484 | A1* | 6/2017 | Park | H01M 4/505 |
| 2018/0294474 | A1* | 10/2018 | Zhamu | C08K 9/08 |

FOREIGN PATENT DOCUMENTS

| | | |
|---|---|---|
| JP | 2011119263 A | 6/2011 |
| JP | 2011241133 A | 12/2011 |
| JP | 2015153697 A | 8/2015 |
| JP | 2016100263 A | 5/2016 |
| WO | 2011125834 A1 | 10/2011 |
| WO | 2013129150 A1 | 9/2013 |

OTHER PUBLICATIONS

Hu, et al., Effects of amorphous AlPO4 coating on the electrochemical performance of BiF3 cathode materials for lithium-ion batteries, Journal of Power Sources 218 (2012) 204-211.

Ma, et al., Fabrication of FeF3 nanocrystals dispersed into a porous carbon matrix as a high performance cathode material for lithium ion batteries, Journals of Materials Chemistry A, 2013, 1, 15060-15067.

W. Wu et al., "Structure and electrochemical performance of FeF3/V2O5 composite cathode material for lithium-ion battery", Journal of Alloys and Compounds, vol. 486, pp. 93-96, Jul. 2009.

J. Gao et al., "High capacity Li[Li0.2Mn0.54Ni0.13Co0.13]O2—V2O5 composite cathodes with low irreversible capacity loss for lithium ion batteries", Electrochemistry Communications, vol. 11, pp. 84-86, 2009.

H. He et al., "Effects of amorphous V2O5 coating on the electrochemical properties of Li[Li0.2Mn0.54Ni0.13Co0.13]O2 as cathode material for Li-ion batteries", Journal of Alloys and Compounds, vol. 680, pp. 95-104, 2016.

A. Nojima et al., "Analysis of V2O5 composite LIB cathode material for improvement of initial charge-discharge efficiency", TDK, 2011.

B. Das et al., "LiF/Fe/V2O5 nanocomposite as high capacity cathode for lithium ion batteries", Journal of Power Sources, vol. 267, pp. 203-211, 2014.

International Search Report for Application No. PCT/JP2018/024386, dated Oct. 2, 2018.

Chinese Office Action dated Mar. 30, 2022 in corresponding Chinese Application No. 201880043784.2.

* cited by examiner

Fe:V=1:1

XRD profiles of the obtained FeF$_3$-xLi$_2$O·[(90-x)V$_2$O$_5$-10P$_2$O$_5$ (x=0~20).

FIG. 18A LiF + Fe + V₂O₅ GLASS COMPOSITE POSITIVE ELECTRODE
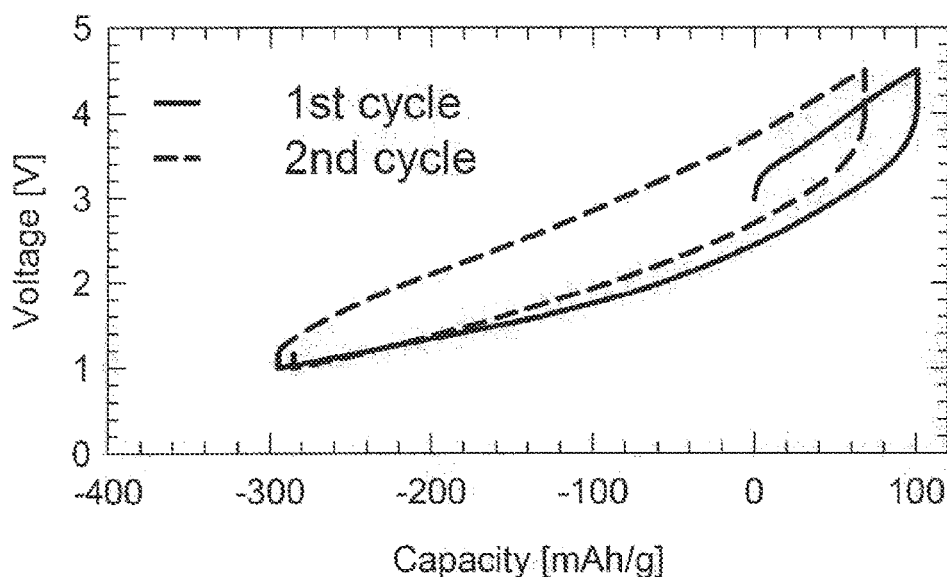
FIG. 18B LiF + Fe COMPOSITE POSITIVE ELECTRODE
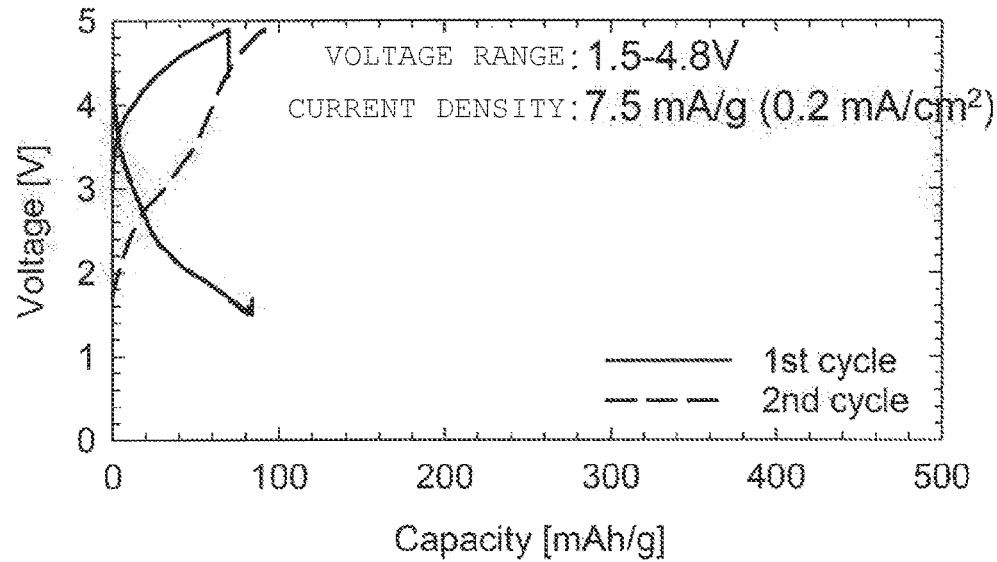

POSITIVE ELECTRODE ACTIVE SUBSTANCE FOR NON-AQUEOUS SECONDARY BATTERY AND NON-AQUEOUS SECONDARY BATTERY INCLUDING THE SAME

CROSS REFERENCE TO RELATED APPLICATIONS

The present application is a continuation of PCT patent application no. PCT/JP2018/024386, filed on Jun. 27, 2018, which claims priority to Japanese patent application no. JP2017-129338 filed on Jun. 30, 2017, the entire contents of which are being incorporated herein by reference.

BACKGROUND

The present disclosure generally relates to secondary batteries, and particularly relates to a novel positive electrode active substance constituting a non-aqueous secondary battery, and a secondary battery including the same.

A typical example of a secondary battery including a positive electrode, a negative electrode, and a non-aqueous electrolytic solution is a non-aqueous secondary battery. Non-aqueous secondary batteries have already been put into practical use as compact power sources for mobile phones and laptop computers. In addition, they can be used as a large power source such as power sources for cars such as electric cars and hybrid cars, and a power source for a distributed power storage, and the demand is increasing.

As a positive electrode used in a non-aqueous secondary battery, a positive electrode active substance made of fluoride or oxide is widely used. For example, iron fluoride ($FeF_3$) is an attractive substance that can be expected to have a large capacitance of 712 mAh/g in terms of theoretical capacitance, but has a large polarization during charge and discharge, and has problems with rate characteristics and cycle characteristics.

In order to improve such characteristics, as a positive electrode active substance for next-generation non-aqueous secondary batteries, various conversion positive electrodes are attracting attention, and are expected to have a high energy density and reduce an environmental load and costs.

SUMMARY

The present disclosure generally relates to secondary batteries, and particularly relates to a novel positive electrode active substance constituting a non-aqueous secondary battery, and a secondary battery including the same.

Since the charge/discharge operation indicated by the charge/discharge curve becomes unstable by adding crystalline $V_2O_5$, a conversion positive electrode is intended to be optimized by keeping the amount of crystalline $V_2O_5$ added within the low concentration range of about several wt %, but still, both the irreversible capacitance and the overvoltage are large, and the cycle characteristics and the rate characteristics remain low.

One possible reason for this is that after several cycles of charge and discharge, the metal compounds derived from the electrodes are aggregated to increase the crystallinity and do not return to the original electrode state. It is conceivable that metallic iron and LiF are aggregated after several cycles and the crystallinity becomes high, so that they do not completely return to $FeF_3$ during the charge reaction.

This disclosure aims to solve the above problem, and an object of the invention is to provide a positive electrode active substance for a non-aqueous secondary battery which exhibits the cycle characteristics and rate characteristics higher than before.

As a result of intensive studies, the present inventors have newly found that the conversion positive electrode (mixed positive electrode) obtained by adding a certain kind of amorphous metal oxide can minimizes aggregation of a metal compound produced after the conversion reaction and/or after the reverse conversion reaction, and can alleviate a large voltage drop during discharge in addition to reduction in overvoltage during charge, whereby the cycle characteristics and the rate characteristics can be greatly improved. Furthermore, it has been found that a non-aqueous secondary battery exhibiting excellent cycle characteristics and rate characteristics can be constructed by combining the positive electrode active substance as the conversion positive electrode and various negative electrode active substances.

According to an embodiment of the present disclosure, a positive electrode active substance for a non-aqueous secondary battery is provided. The positive electrode active substance includes a metal or metal compound including the metal element $M^1$ exhibiting a conversion reaction and/or a reverse conversion reaction, and an amorphous metal oxide of the metal element $M^2$ ($M^2$ includes at least one metal element selected from the group consisting of V, Cr, Mo, Mn, Ti, and Ni.

According to an embodiment of the present disclosure, a non-aqueous secondary battery including a positive electrode including the positive electrode active substance as described herein is also provided.

It should be noted that the effects described herein are not necessarily to be considered limited, and other suitable properties relating to the present technology may be realized and as further described.

BRIEF DESCRIPTION OF THE FIGURES

FIGS. 18A and 18B are a charge/discharge curve of a positive electrode active substance (LiF.Fe—$V_2O_5$.$P_2O_5$ glass mixed positive electrode) according to an embodiment of the present invention, and a charge/discharge curve of a positive electrode active substance LiF.Fe of the comparative example, respectively.

DETAILED DESCRIPTION

Figure 1A:
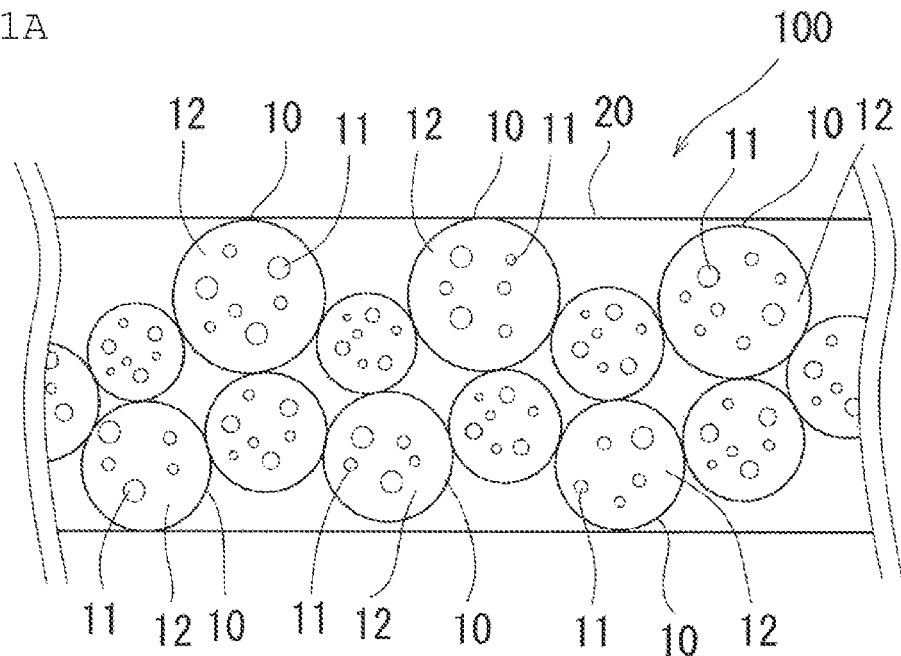
FIGS. 1A and 1B show schematic cross section views of a positive electrode active substance according to an embodiment of the present invention.

As described herein, the present disclosure will be described based on examples with reference to the drawings, but the present disclosure is not to be considered limited to the examples, and various numerical values and materials in the examples are considered by way of example. The positive electrode active substance according to the present invention includes a metal or metal compound containing the metal element $M^1$ that exhibits a conversion reaction and/or a reverse conversion reaction, and an amorphous metal oxide of the metal element $M^2$ ($M^2$ is at least one metal element selected from the group consisting of V, Cr, Mo, Mn, Ti, and Ni).

The conversion reaction means that a metal compound constituting the positive electrode chemically reacts with lithium ions by a discharge reaction, and the metal compound is reduced to change into a metal and a lithium compound. In addition, the reverse conversion reaction means that a chemical reaction proceeds in a direction opposite to the discharge reaction by a charge reaction.

A metal or a metal compound containing the metal element $M^1$ refers to a neat metal containing the metal element $M^1$ (that is, the metal $M^1$ itself), or a metal compound containing the metal element $M^1$. The type is not particularly limited as long as it can cause the conversion reaction and/or the reverse conversion reaction described above, and preferably, is the metal $M^1$ or the metal compound $M^1aXb$ ($M^1$ is at least one metal element selected from the group consisting of Fe, Ti, Co, Bi, Mn and V; X is fluorine, oxygen, chlorine, $PO_4$ phosphate group, $SO_4$ sulfate group, $SiO_4$ silicate group, $CO_3$ carbonate group, or $NO_3$ nitrate group; and a and b are integers).

The metal $M^1$ is not particularly limited as long as it is a neat metal composed of $M^1$ as defined above, but may be preferably metal iron (Fe).

Although the metal compound M1aXb is not particularly limited, preferably, X is fluorine, that is, the fluorine compound $M^1F_3$ can be used. For example, $FeF_3$, $TiF_3$, $CoF_3$, $BiF_3$, $MnF_3$, or $VF_3$ (Fe, Ti, Co, Bi, Mn, or V as $M^1$) can be used.

As a result, the positive electrode active substance according to the present invention may include, for example, one of $FeF_3$, $TiF_3$, and $VF_3$, and an amorphous metal oxide of the metal element $M^2$. For example, it may include $FeF_3$, and an amorphous metal oxide of the metal element $M^2$.

One feature of the amorphous metal oxide of the metal element $M^2$ is that the amorphous metal oxide is glassy. Since the conventional positive electrode active substance is based on the premise that a crystal is used, the positive electrode active substance according to the present invention has a configuration and characteristics that are completely different from those of the conventional positive electrode active substance.

Furthermore, the positive electrode active substance according to the present invention is characterized in that grains of the metal (or metal compound) containing the metal element $M^1$ are dispersed in the glassy amorphous metal oxide of the metal element $M^2$ (See Example 2 described later).

Figure 1B:
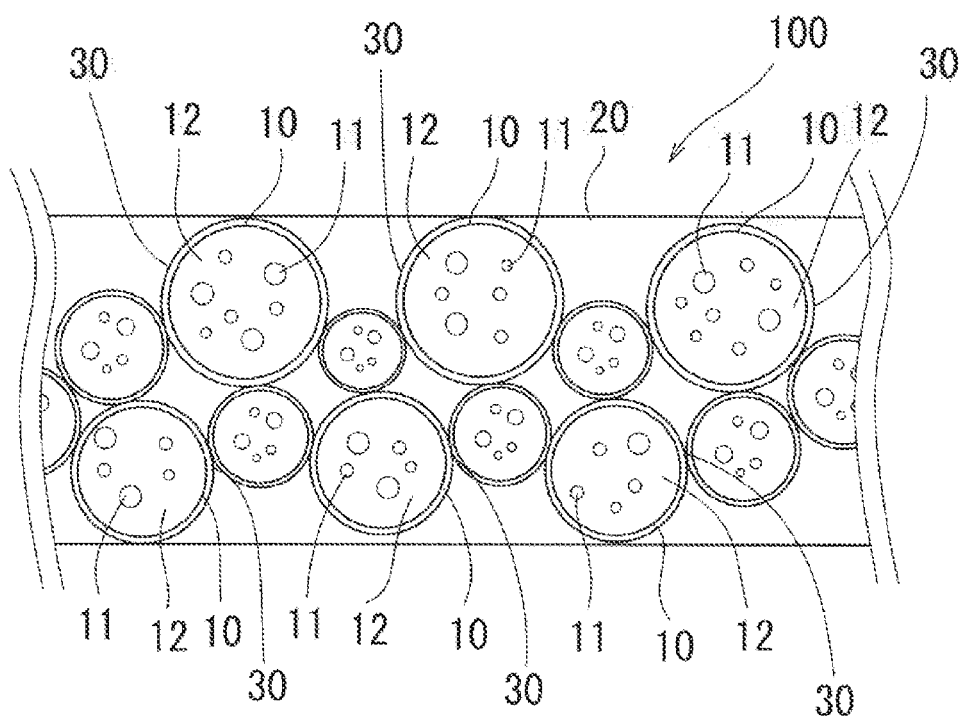

FIGS. 1A and 1B show enlarged schematic cross section views of the positive electrode active substance according to the present invention as a diagram schematically showing the TEM-EDS analysis result obtained in Example 2 described later, particularly in FIG. 14A.

As shown in FIG. 1A, a plurality of positive electrode active substances 10 according to the present invention exists as grains constituting a positive electrode 100, and respective grains are carried by a binder 20 such as a thermoplastic resin. The respective positive electrode active substances 10 are configured such that grains of a metal (or metal compound) 11 containing the metal element $M^1$ are dispersed in a glassy amorphous metal oxide 12 of the metal element $M^2$. That is, in respective grains of the positive electrode active substances 10, grains of the metal (or metal compound) 11 containing the metal element $M^1$ are dispersed as secondary grains in the glassy amorphous metal oxide 12 of the metal element $M^2$.

Further, as described later, the carbon coating treatment may be performed on the positive electrode active substance according to the present invention using a carbon source such as acetylene black (AB). In this case, as shown in FIG. 1B, the positive electrode 100 is configured in a state where the periphery of respective grains of the positive electrode active substances 10 described above is coated with a carbon coating material 30.

An example of such an amorphous metal oxide of the metal element $M^2$ include an amorphous material of $V_2O_5$, $Cr_3O_8$, $MoO_3$, $MnO_2$, $TiO_2$, or NiO (each amorphous material is also expressed as a-$V_2O_5$, a-$Cr_3O_8$, a-$MoO_3$, a-$MnO_2$, a-$TiO_2$, or a-NiO). Because of the ease of handling, it is preferable to use a-$V_2O_5$.

An example of the amorphous metal oxide of the metal element $M^2$ may include an amorphous material of a mixed composition of the metal oxide ($V_2O_5$, $Cr_3O_8$, $MoO_3$, $MnO_2$, $TiO_2$, or NiO) to which a network former (for example, 5 to 10 wt %) such as $P_2O_5$ is added.

Therefore, for example, the amorphous metal oxide a-$V_2O_5$ is preferably an amorphous metal oxide composed of $V_2O_5$ and $P_2O_5$. Although the blending ratio of $P_2O_5$ in this case is not particularly limited, the smaller the molar ratio of $P_2O_5$ in the entire a-$V_2O_5$, the more preferable it is. From the point of making it easier to maintain the glassy form, the ratio is preferably 5% or more. More preferably, it is 5% or more and 10% or less, for example, 5% or 10%.

Furthermore, the positive electrode active substance according to the present invention more preferably includes an alkali metal salt $AcXd$ (A is Li or Na; X is fluorine, oxygen, chlorine, $PO_4$ phosphate group, $SO_4$ sulfate group, $SiO_4$ silicate group, $CO_3$ carbonate group, or $NO_3$ nitrate group; and c and d are integers), and can reduce overvoltage and irreversible capacitance more. As a result, the discharge potential, rate characteristics, and cycle characteristics can be further improved.

Although such an alkali metal salt $AcXd$ is not particularly limited, lithium salts such as LiF, $Li_2O$, LiCl, or sodium salts such as NaF, $Na_2O$, NaCl can be used. More preferably, LiF or NaF is used. Besides this, it is also possible to use $Li_3PO_4$, or lithium salts or sodium salts having $PO_4$ phosphate group, $SO_4$ sulfate group, $SiO_4$ silicate group, $CO_3$ carbonate group, or $NO_3$ nitrate group.

As a result, the positive electrode active substance according to the present invention can include, for example, metallic iron (Fe) as the metal $M^1$, and an amorphous metal oxide of the metal element $M^2$, and can include, furthermore, $Li_2O$, LiF, NaF or $Li_3PO_4$ as the alkali metal salt $AcXd$. Although the blending molar ratio of the alkali metal salt $AcXd$ in the whole positive electrode active substance is not particularly limited, from the point of exerting a good balance between a stable amorphous state, an overvoltage drop, and an irreversible capacitance reduction, it is preferably 5% or more and 25% or less, more preferably 5% or more and 20% or less, and for example, 10%, 11%, 12%, 13%, 14%, or 15%.

An example of the positive electrode active substance according to the present invention includes $FeF_3$ as the metal compound $M^1aXb$, and a-$V_2O_5$ as the amorphous metal oxide of the metal element $M^2$. The blending molar ratio of these substances is not particularly limited, but the molar ratio $FeF_3$/a-$V_2O_5$ is preferably 0.25 or more, and more preferably 0.25 or more and 1 or less. In other words, when focusing on the metal elements, the molar ratio Fe/V is preferably 0.5 or more, preferably 0.5 or more and 4 or less, more preferably 0.5 or more and 2 or less, and for example, Fe/V can have a molar ratio of 1 (corresponding to 30 wt % in weight ratio).

From the viewpoint of the weight ratio, the weight ratio Fe/V is preferably 16 wt % or more, more preferably 16 wt % or more and 70 wt % or less, and for example, 30 wt %.

As the metal compound $M^1aXb$, $TiF_3$ or $VF_3$ can be used besides the above-mentioned $FeF_3$. Besides a-$V_2O_5$ described above, a-$Cr_3O_8$, a-$MoO_3$, a-$MnO_2$, a-$TiO_2$, or a-NiO can also be used as the amorphous metal oxide of the metal element $M^2$.

Besides the above metal compound $M^1aXb$, a mixture of the metal $M^1$ and the alkali metal salt $AcXd$ can also be used. In this case, the positive electrode active substance according to the present invention can include, for example, a mixture of LiF and Fe, a mixture of LiF and Ti, or a mixture of LiF and V, and as an amorphous metal oxide of the metal element $M^2$, a-$V_2O_5$, a-$Cr_3O_8$, a-$MoO_3$, a-$MnO_2$, a-$TiO_2$, or a-NiO.

The metal or the metal compound containing the metal element $M^1$, which is the raw material of the positive electrode active substance according to the present invention, and the amorphous metal oxide of the metal element $M^2$ (and optionally the alkali metal salt $AcXd$) are pulverized and mixed during the mixing. The specific means used for pulverization/mixing is not particularly limited.

For example, in order to prevent oxidation of the metal compound, it is preferable to use a ball mill under a dry process (for example, relative humidity of 10% or less), and among these, it is preferable to use a planetary ball mill because the raw materials can be sufficiently pulverized and mixed. Besides this, various means conventionally used for the purpose of pulverizing and mixing solid substances can be applied, and examples thereof include a vibration mill, a turbo mill, and a disk mill.

The mixture thus obtained preferably has an average grain diameter in the range of, for example, 0.1 to 50 μm, more preferably in the range of 0.1 to 10 μm, and particularly preferably in the range of 0.5 to 3 μm. This is because if the average grain diameter of the positive electrode active substance is too small, the handleability may be deteriorated, and if the average grain diameter of the positive electrode active substance for a non-aqueous secondary battery is too large, it is difficult to obtain a flat active substance layer.

In addition, in the battery characteristic evaluation at a low rate, an active substance having a large average grain diameter is advantageous for increasing energy density. However, when battery characteristics at a high rate are required, it can be handled by perform control by making the active substance average grain diameter smaller. In addition, the average grain diameter of the positive electrode active substance according to the present invention can be obtained, for example, by measuring and averaging the grain diameter of the positive electrode active substance observed with a scanning electron microscope (SEM).

The positive electrode active substance according to the present invention can be produced by dry mixing, under an inert atmosphere, a metal or a metal compound containing the above-described metal element $M^1$, and an amorphous metal oxide of the metal element $M^2$ (and optionally an alkali metal salt $AcXd$).

Especially for starting materials, when using $FeF_3$ as the metal compound containing the metal element $M^1$, and using a-$V_2O_5$ as the amorphous metal oxide of the metal element $M^2$, it has been confirmed from XRD pattern analysis that an amorphous positive electrode active substance having no synthesis example has been produced so far (see Examples described later). This obtained positive electrode active substance is a particularly preferred positive electrode active substance of the present invention, and it has been confirmed that the cycle characteristics and rate characteristics are particularly high, which were not obtained with a conventional conversion-type positive electrode active substance containing the lithium element (see Examples described later).

In other words, the result of adding the vanadate glass ($V_2O_5 \cdot P_2O_5$ glass) to $FeF_3$, which is one of the conversion positive electrodes that are considered promising as positive electrodes for next-generation Li-ion secondary batteries has confirmed that for other positive electrode characteristics such as cycle characteristics and output characteristics, this has a significant improvement over $FeF_3$ alone. This is probably because the addition of amorphous conductive glass suppresses the aggregation of metallic iron that occurs as a discharge product and improves the reactivity of LiF and metallic iron to $FeF_3$ during the charge reaction.

As a result, it is conceived that the high rate characteristics are obtained by alleviating the potential step due to the conversion reaction during charge and discharging, and suppressing the overvoltage. In addition, it is conceived that the high cycle characteristics are maintained even after repeated charge/discharge operations by alleviating the volume change in the conversion reaction due to the conversion reaction during charge and discharge, and suppressing aggregation to the metal.

Furthermore, it has been confirmed that the irreversible capacitance can be further reduced by including the alkali metal salt $Ac_Xd$ in the raw material. Examples of such alkali metal salt $Ac_Xd$ include $Li_2O$, LiF, NaF, and $Li_3PO_4$. For example, in addition to the above-described configuration of $FeF_3$ and the amorphous metal oxide a-$V_2O_5$, the alkali metal salt LiF can be further included as a raw material. In addition to this, for example, the raw material can be composed of the metal iron (Fe) as a metal containing the metal element $M^1$, the amorphous metal oxide a-$V_2O_5$, and the alkali metal salt LiF. These alkali metal salt LiF and the alkali metal salt $Li_2O$ can be replaced with the alkali metal salt NaF or the alkali metal salt $Li_3PO_4$. In any case, the irreversible capacitance is further reduced by including the alkali metal salt $Ac_Xd$ in the raw material.

It should be understood that the metal or metal compound containing the metal element $M^1$, the alkali metal salt $Ac_Xd$, and the amorphous metal oxide of the metal element $M^2$ may be not only composed of one kind each, but a plurality of kinds in combination.

As a negative electrode for the positive electrode active substance according to the present invention, a carbon negative electrode (e.g., graphite) is preferred from the viewpoint of energy density, cost, and ease of handling, and in addition, it is preferable to use the lithium titanium oxide (LTO) (for example, $Li_4Ti_5O_{12}$) from the safety of the battery and ease of handling, but the present invention is not limited to this, and the lithium metal can also be used.

The positive electrode active substance according to the present invention may be used as it is as the positive electrode of the non-aqueous secondary battery, but in order to improve the conductivity (rate characteristics) of the electrode, a composite with a known conductive material may be formed. In particular, it is preferable to add and mix a carbon source.

That is, according to the present invention, from the viewpoint of improving rate characteristics, the carbon coat can be performed by pulverizing and mixing the positive electrode active substance obtained above together with carbon fine grains in an inert atmosphere. As the inert atmosphere, vacuum, nitrogen gas, argon gas, or the like can be used. For example, the argon gas can be used.

Such addition of the carbon source may be performed in multiple stages (for example, in two stages). In this case, the first stage is performed mainly for the purpose of pulverization/mixing, and the second stage is performed mainly for the purpose of carbon coating.

In the first stage, acetylene black, graphite, carbon nanotube, or the like can be used as the carbon source, and among these, the acetylene black is particularly preferred from the viewpoint of ease of handling. In the second stage, furnace black, channel black, acetylene black, ketjen black, thermal black, or the like can be used, and among these, the acetylene black is preferred because of its high conductivity when used as an electrode (For example, see Examples below).

Figure 2A:
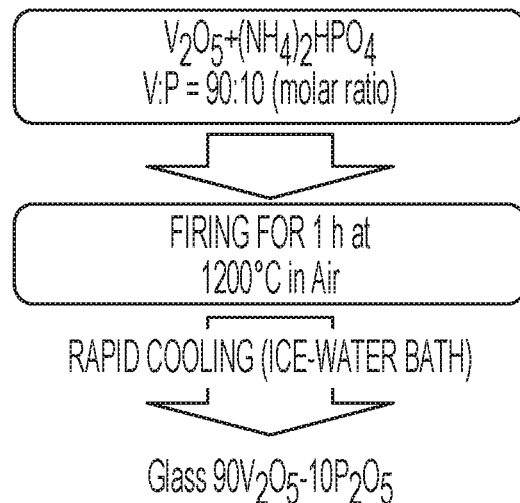
FIG. 2A is a method of preparing an amorphous metal oxide $V_2O_5$ constituting a positive electrode active substance according to an embodiment of the present invention.

A method of producing a positive electrode active substance of the present invention, first, includes purchasing or producing an amorphous metal oxide of a metal element $M^2$ as a raw material. Although it is possible to construct an amorphous metal oxide from only the neat $V_2O_5$, for example, when producing using $V_2O_5$ as the amorphous metal oxide, more preferably, as described above, it is constructed to include the compounds that will be a network former such as $P_2O_5$. For example, as an example of using $P_2O_5$ as a compound that becomes a network former, as shown in FIG. 2A, the vanadium oxide ($V_2O_5$) and the ammonium phosphate (($NH_4$)$_2HPO_4$) are mixed in a stoichiometric ratio to achieve the desired ratio (for example, molar ratio V:P is 90:10), fired in the atmosphere at 1000° C. or higher (for example, 1200° C.) for several hours (for example, one hour), and afterwards, are quenched (for example using an ice-water bath) to obtain the $V_2O_5$ glass (For example, molar ratio $V_2O_5$:$P_2O_5$=90:10 (hereinafter also referred to as $90V_2O_5$-$10P_2O_5$)), which is an amorphous metal oxide. In addition, for the positive electrode using such $V_2O_5$ glass, furthermore, the positive electrode ($FeF_3 \cdot Li_2O$—$V_2O_5 \cdot P_2O_5$ glass mixed positive electrode) when the above-mentioned alkali metal salt (for example, $Li_2O$) is added can be represented by a general formula as [$FeF_3$-$xLi_2O$-(90-x) $V_2O_5$-$10P_2O_5$] when $V_2O_5 \cdot P_2O_5$=90:10, where x is the blending molar ratio of $Li_2O$. The blending molar ratio x of $Li_2O$ is not particularly limited, but more preferably x=0 to 20. Of course, the ratio of $V_2O_5 \cdot P_2O_5$ can be freely changed. If the blending molar ratio of $P_2O_5$ is y, it can be expressed as [$FeF_3$-$xLi_2O$-(100-x-y) $V_2O_5$-$yP_2O_5$] by a general formula.

Figure 2B:
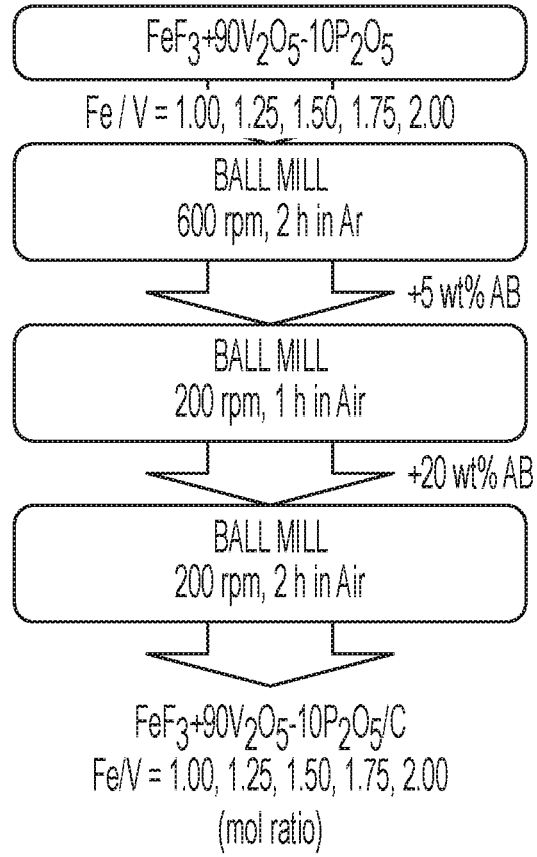
FIG. 2B is a method of preparing a positive electrode active substance ($FeF_3$—$V_2O_5 \cdot P_2O_5$ glass mixed positive electrode) according to an embodiment of the present invention.

Next, using such an amorphous metal oxide of the metal element $M^2$ (for example, $V_2O_5$ glass), an example of the method of producing the positive electrode active substance according to the present invention when the metal compound $M^1aXb$ as a raw material is $FeF_3$ includes, first, weigh $FeF_3$ and $V_2O_5$ glass as shown in FIG. 2B. The molar ratio Fe/V is not particularly limited, but can be, for example, 1 to 4, and for example, 1.00, 1.25, 1.50, 1.75, 2.00, 4.00, and the like.

Next, the substance is sealed in a sealed container (atmosphere control container) under an inert gas (e.g., Ar) atmosphere, mixed and pulverized at 600 rpm for two hours, further mixed and pulverized at 200 rpm for one hour after adding acetylene black (for example, 5 wt %), and further mixed and pulverized at 200 rpm for two hours after further adding acetylene black (for example, 20 wt %) having a different concentration to obtain the positive electrode active substance ($FeF_3$—$V_2O_5$ glass mixed positive electrode) (for example, see Examples described later).

According to the present invention, the non-aqueous secondary battery positive electrode including the positive electrode active substance obtained as described above is provided.

It is possible to use the positive electrode in which a mixture (for example, weight ratio 95:5) of the $FeF_3$—$V_2O_5$ glass mixed positive electrode and the polyacrylic acid binder is coated on an aluminum foil.

Figure 3:
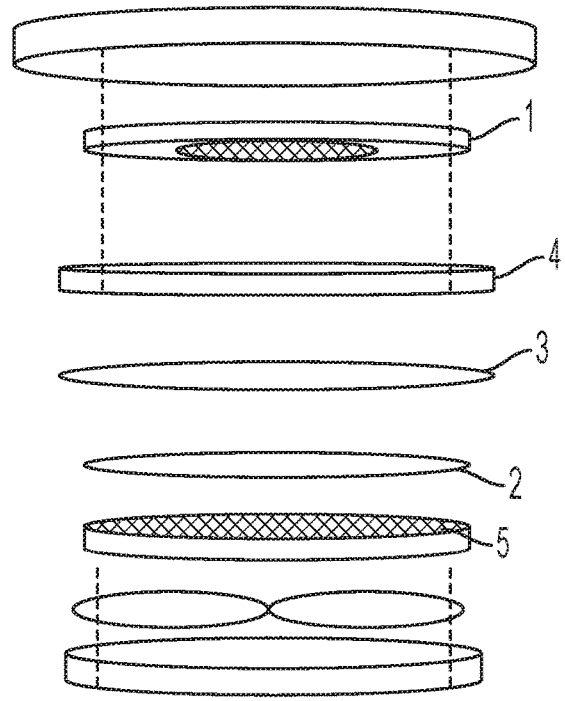
FIG. 3 is a schematic view of a non-aqueous secondary battery layer according to an embodiment of the present invention.

FIG. 3 is a diagram showing an example of the layer configuration of the non-aqueous secondary battery according to the present invention, and is a schematically exploded view in the stacking direction. The non-aqueous secondary battery according to the present invention is not necessarily limited to this example.

As shown in FIG. 3 the non-aqueous secondary battery, for example, including 1M $LiPF_6$/EC:DMC (1:1 v/v) as the electrolytic solution, is configured by a coin cell (for example, 2032 coin type cell) including a coated electrode 1 composed of this positive electrode, a lithium metal 2 as the negative electrode, a separator 3 disposed between these electrodes, a gasket 4 as the fixing sealing material for providing airtightness between the coated electrode 1 and the separator 3, and an Ni mesh spacer 5 on which the lithium metal 2 is placed and fixed.

Thus, in the present invention, the non-aqueous secondary battery including a positive electrode containing a positive electrode active substance, a negative electrode, and an electrolyte interposed therebetween is provided, and exhibits a high energy density. It is particularly preferable to use the lithium metal. In this case, the non-aqueous secondary battery that has a high energy density can be produced at low cost, and is easy to handle is provided. Besides this, a carbon-based material (for example, graphite) or a lithium titanium oxide (LTO) (for example, $Li_4Ti_5O_{12}$) can be used as the negative electrode.

Hereinafter, the positive electrode, the negative electrode, and the electrolyte layer included in the non-aqueous secondary battery according to the present invention, and the separator and the battery case suitably included in the non-aqueous secondary battery according to the present invention will be described in detail.

The positive electrode used in the present invention preferably includes a positive electrode active substance layer containing the above-mentioned positive electrode active substance, and in addition to this, includes a positive electrode current collector and a positive electrode lead connected to the positive electrode current collector.

As the current collector, a conductor such as aluminum, titanium, nickel, stainless steel, or copper is used. Examples of the shape of the current collector include a foil shape, a net shape, and a porous shape. Among these, an aluminum foil is preferable because it is stable at the positive electrode operating potential of the secondary battery, easily processed into a thin film, and inexpensive.

A positive electrode for a non-aqueous secondary battery is produced by carrying (stacking) a positive electrode mixture containing an active substance, a conductive material and a binder on a current collector.

A method of carrying the positive electrode mixture on the current collector includes (1) a method of pressure-molding the positive electrode mixture, and (2) a method of mixing the organic solvent and the like, and the positive electrode mixture, preparing a paste of positive electrode mixture, applying the paste to the current collector, and furthermore, fixing by pressing or the like after drying the paste applied to the current collector.

Examples of the method of applying the paste to the current collector include a slit die coating method, a screen coating method, a curtain coating method, a knife coating method, a gravure coating method, and an electrostatic spray method. In the present invention, a plurality of these coating methods may be used in combination.

The negative electrode is generally produced by carrying (stacking) a negative electrode mixture containing an active substance, a conductive material and a binder on a current collector.

A method of carrying the negative electrode mixture on the current collector includes (1) a method of pressure-molding the negative electrode mixture, and (2) a method of mixing the organic solvent and the like, and the negative electrode mixture, preparing a paste of negative electrode mixture, applying the paste to the current collector, and furthermore, fixing by pressing or the like after drying the paste applied to the current collector.

As the negative electrode active substance, a lithium metal or an alloy containing lithium is desirable for increasing the energy density. However, when the negative electrode having a lithium-containing composition is used, a reducing or inert gas atmosphere is indispensable in the production process. In order to reduce the producing cost and increase the safety of the battery, a carbon material such as graphite is suitable. As another negative electrode candidate, the lithium titanium oxide (LTO) (for example, $Li_4Ti_5O_{12}$) capable of inserting/extracting lithium ions can also be used.

As a binder, the thermoplastic resin is used, and in particular, examples thereof include fluorine resins such as polyvinylidene fluoride (hereinafter sometimes referred to as "PVDF"), polytetrafluoroethylene (hereinafter sometimes referred to as "PTFE"), ethylene tetrafluoride propylene hexafluoride vinylidene fluoride copolymer, propylene hexafluoride•vinylidene fluoride copolymer and tetrafluoroethylene•perfluorovinyl ether copolymer, and polyolefin resins such as polyethylene and polypropylene. These thermoplastic resins are used alone or in combination of two or more.

The non-aqueous electrolyte in the present invention is a liquid or solid composed of a substance containing alkali ions, contains, for example, lithium ions as alkali ions, and may contain alkali ions other than lithium ions.

The content ratio of lithium ions contained in the non-aqueous electrolyte is preferably 50% by mass or more of the total alkali ions, more preferably 75% by mass or more, and further preferably 80% by mass or more (including 100% by mass).

The non-aqueous electrolyte in the present invention is usually used as a non-aqueous electrolytic solution containing an electrolyte and an organic solvent. Examples of the electrolyte include $LiClO_4$, $LiPF_6$, $LiAsF_6$, $LiSbF_6$, $LiCF_3SO_3$, $LiN(SO_2CF_3)_2$, lower aliphatic carboxylic acid lithium salt, and $LiAlCl_4$. These may be a mixture of two or more. Preferably, the electrolyte contains at least one lithium salt selected from the group consisting of $LiClO_4$, $LiPF_6$, $LiAsF_6$, $LiSbF_6$, $LiBF_4$, $LiCF_3SO_3$ and $LiN(SO_2CF_3)_2$.

Examples of the organic solvent include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, and 1,2-di (methoxycarbonyloxy) ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide, and N,N-dimethylacetamide; carbamates such as 3-methyl-2-oxazolidone; sulfur-containing compounds such as sulfolane, dimethyl sulfoxide, and 1,3-propane sultone; or those obtained by further introducing a fluorine substituent into the organic solvent.

In the present invention, the solid electrolyte may be used as the non-aqueous electrolyte instead of the non-aqueous electrolytic solution. Examples of the solid electrolyte include a so-called gel type electrolyte in which an electrolytic solution is held in a polymer solid electrolyte such as a polymer containing at least one selected from a polyethylene oxide polymer, a polyorganosiloxane chain and a polyoxyalkylene chain; sulfide-containing electrolytes such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, and $Li_2S$—$SiS_2$—$Li_2SO_4$; and inorganic solid electrolytes such as NASICON-type electrolytes such as $LiZr_2(PO_4)_3$.

By using such a solid electrolyte, the safety of the non-aqueous secondary battery may be further improved. In the non-aqueous secondary battery of the present invention, when the solid electrolyte is used, the solid electrolyte may function as a separator. In this case, the separator may not be required.

The non-aqueous secondary battery of the present invention usually further includes a separator. The separator is in the form of a porous film, a nonwoven fabric, a woven fabric or the like made of materials such as polyolefin resins such as polyethylene and polypropylene, fluorine resins, nitrogen-containing aromatic polymers, or the like.

The thickness of the separator is preferably as thin as possible as long as the mechanical strength is maintained in that the volume energy density of the battery is increased and the internal resistance is reduced. In general, the thickness of the separator is preferably about 5 to 200 μm, more preferably about 5 to 40 μm.

For the shape of the electrode group, for example, the shape of the cross-section when this electrode group is cut in the direction perpendicular to the winding axis includes a circle, an ellipse, a rectangle, a rectangle without a corner, a laminated shape or the like.

Examples of the shape of the non-aqueous secondary battery include a paper shape, a coin shape, a cylindrical shape, and a square shape.

It has been clarified that the non-aqueous secondary battery obtained in this way can alleviate a large voltage drop during discharge in addition to reducing overvoltage during charge, and furthermore, both the charge/discharge cycle characteristics and the rate characteristics are greatly improved (see Examples described later), compared with the conventional non-aqueous secondary battery.

Hereinafter, the present invention will be described more specifically with reference to Examples. However, the present invention is not limited to these Examples.

EXAMPLE 1

First, in order to produce an amorphous metal oxide $V_2O_5$ as a raw material, $V_2O_5$ and diammonium hydrogen phosphate $(NH4)_2HPO_4$ were mixed so that the molar ratio of V:P is 90:10, fired in the atmosphere at 1200° C. for one hour, and thereafter, quenched using an ice-water bath to obtain the $V_2O_5.P_2O_5$ glass ($90V_2O_5$-$10P_2O_5$), which is an amorphous metal oxide $V_2O_5$.

This obtained $V_2O_5.P_2O_5$ glass and $FeF_3$ (produced by Wako Pure Chemical Corporation) were mixed with each sample weighed so that the molar ratio was Fe/V=1.00, 1.25, 1.50, 1.75, 2.00, and 4.00. For each sample, the mixture was placed in a planetary ball mill container capable of controlling the atmosphere, and sealed together with 40 g of zirconia balls having a diameter of 3 mm in an argon atmosphere. In this container, the mixture was mixed and pulverized for 2 hours with a ball mill (pulverisette 7, produced by Fritsch) under the condition of 600 rpm, furthermore, 5 wt % acetylene black (HS-100, produced by Denka Company Limited) was added, and the mixture was further mixed and pulverized by the ball mill for one hour under the condition of 200 rpm. Further, 20 wt % acetylene black (HS-100, produced by Denka Company Limited) was added, and further mixed and pulverized by the ball mill for two hours under the condition of 200 rpm to obtain the positive electrode active substance ($FeF_3$—$V_2O_5.P_2O_5$ glass mixed positive electrode).

The X-ray diffraction measurement was performed on the positive electrode active substance for a non-aqueous secondary battery obtained above. Detailed measurement conditions are as follows.

X-ray diffraction measurement device: TTRIII (Cu-Kα, produced by Rigaku Corporation) measurement range: 2θ=10-80°

Measurement interval: 0.02°

Scanning speed: 0.02°/min

Measurement voltage: 50 kV

Measurement current: 300 mA

Figure 4:
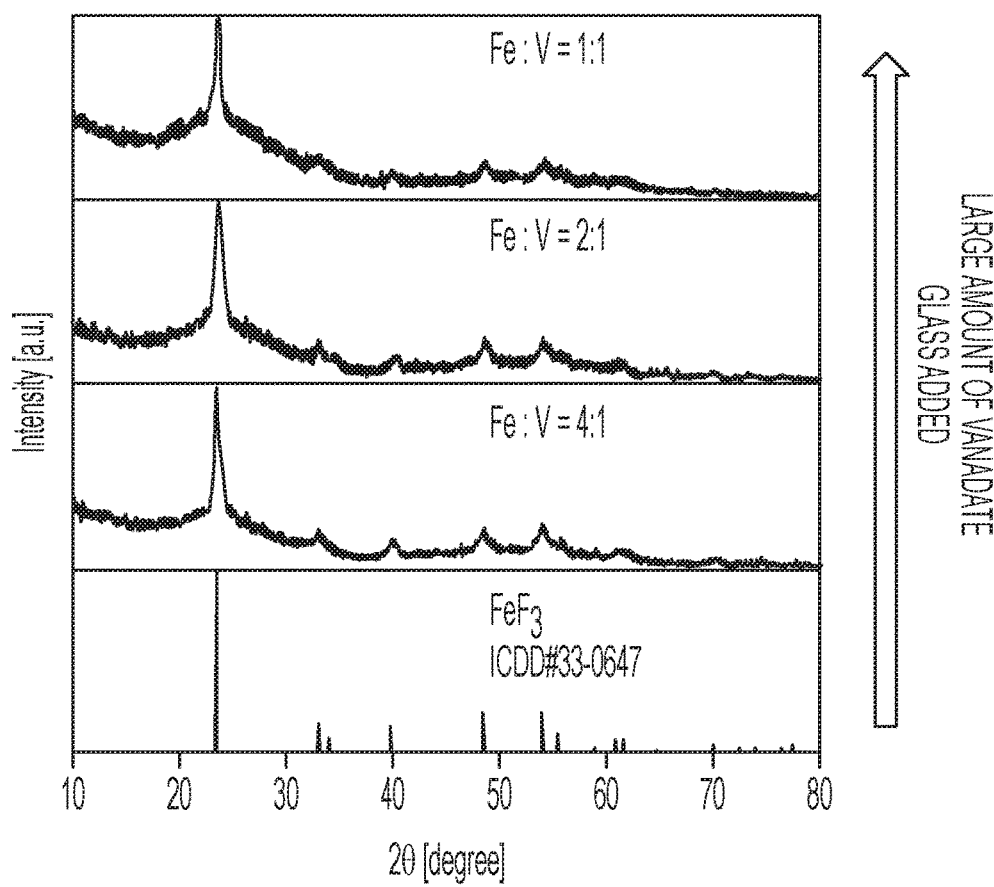
FIG. 4 shows an XRD pattern result of a positive electrode active substance according to an embodiment of the present invention.

FIG. 4 shows an XRD pattern of the $FeF_3$—$V_2O_5.P_2O_5$ glass mixed positive electrode, which is a positive electrode active substance for a non-aqueous secondary battery. In addition to the XRD peak obtained from the ICDD data of iron fluoride (FeF3) shown as a reference a broad halo peak showing amorphous property was confirmed in the XRD pattern of the obtained positive electrode active substance.

EXAMPLES 2

The positive electrode active substance for a non-aqueous secondary battery ($FeF_3$—$V_2O_5.P_2O_5$ glass mixed positive electrode), as a positive electrode active substance, which was produced by the method of Example 1 above and on which the carbon coating treatment was performed and polytetrafluoroethylene (PTFE) (produced by DAIKIN INDUSTRIES, LTD, Polyflon PTFE F-103) as an adhesive were used.

The positive electrode active substance after carbon coating and the adhesive were mixed so that the positive electrode active substance after carbon coating:the adhesive=95 wt %:5 wt % to form a disk-shaped electrode having a diameter of 10 mm.

The titanium mesh was prepared as the positive electrode current collector. The lithium metal (produced by Honjo Metal) was prepared as the negative electrode. The non-aqueous electrolytic solution 1M $LiPF_6$/EC:DMC=1:1 (volume ratio) (produced by Tomiyama Pure Chemical Industries, Ltd.) was prepared as the electrolytic solution. The polypropylene separator (registered trademark "Celgard", 3501) was prepared as the separator. The coin cell (SUS2032 type) was prepared as the battery case. The positive electrode current collector, the positive electrode mixture, the electrolyte layer, and the negative electrode are housed in a battery case in the order of the aluminum foil, the positive electrode mixture layer, the electrolyte layer, and the lithium metal, and the non-aqueous secondary batter of Example 2 was produced as shown in the following table. The above steps were all performed in a glove box in an argon atmosphere.

TABLE 1

| Coin cell | 2032 type |
| --- | --- |
| Positive electrode (diameter: 15 mm) | Activator: *AB: **PAA = 70: 25: 5 (wt. %)<br>*AB: Acetylene black<br>*PAA: Polyacrylic acid |
| Negative electrode (diameter: 15 mm) | Li metal |
| Separator | Polypropylene film |
| Electrolyte | 1 M LiPF$_6$/EC: DMC (1: 1 v/v) |

The above non-aqueous secondary battery was subjected to a charge/discharge test in a constant current mode at 25° C. Specifically, first, the battery was discharged to 1.0 V under the condition of current density of 0.2 mA/cm$^2$, and then charged in a constant current mode with 4.5 V as the upper limit. The capacitance obtained by performing discharge to 1.0 V was defined as the discharge capacitance.

Figure 5:
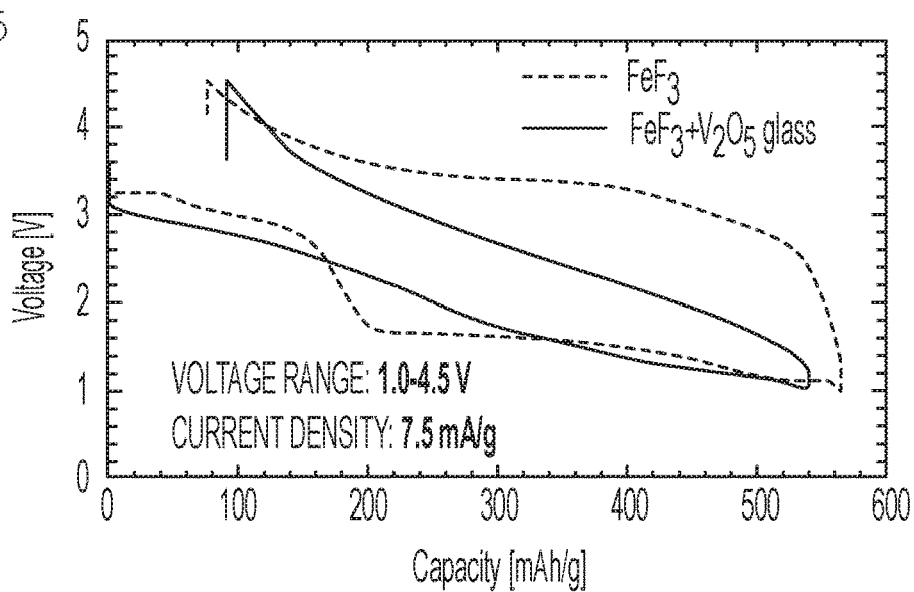
FIG. 5 shows a charge/discharge curve of a positive electrode active substance according to an embodiment of the present invention, together with a comparative example ($FeF_3$).

FIG. 5 is the obtained charge/discharge curve. For comparison, the charge/discharge curve of the conventional positive electrode active substance FeF$_3$ was also checked. From this result, it was confirmed that the positive electrode active substance of this Example was capable of suppressing a large voltage drop during discharge in addition to the overvoltage reduction during charge, as compared with the conventional positive electrode active substance FeF$_3$. In the charge/discharge curve of the positive electrode active substance FeF$_3$, the discharge curve up to 1.8 V indicates the intercalation reaction, and the discharge curve up to 1.0 V from this point indicates the conversion reaction. Therefore, both the conversion reaction and the intercalation reaction, or only a single reaction can be used depending on the setting of the discharge potential and the charge potential. However, it is preferable to use both reactions because a large capacitance can be expected. Further, from the charge/discharge curve of FIG. 5, it is understood that V$_2$O$_5$.P$_2$O$_5$ glass also functions as a positive electrode active substance.

Figure 6:
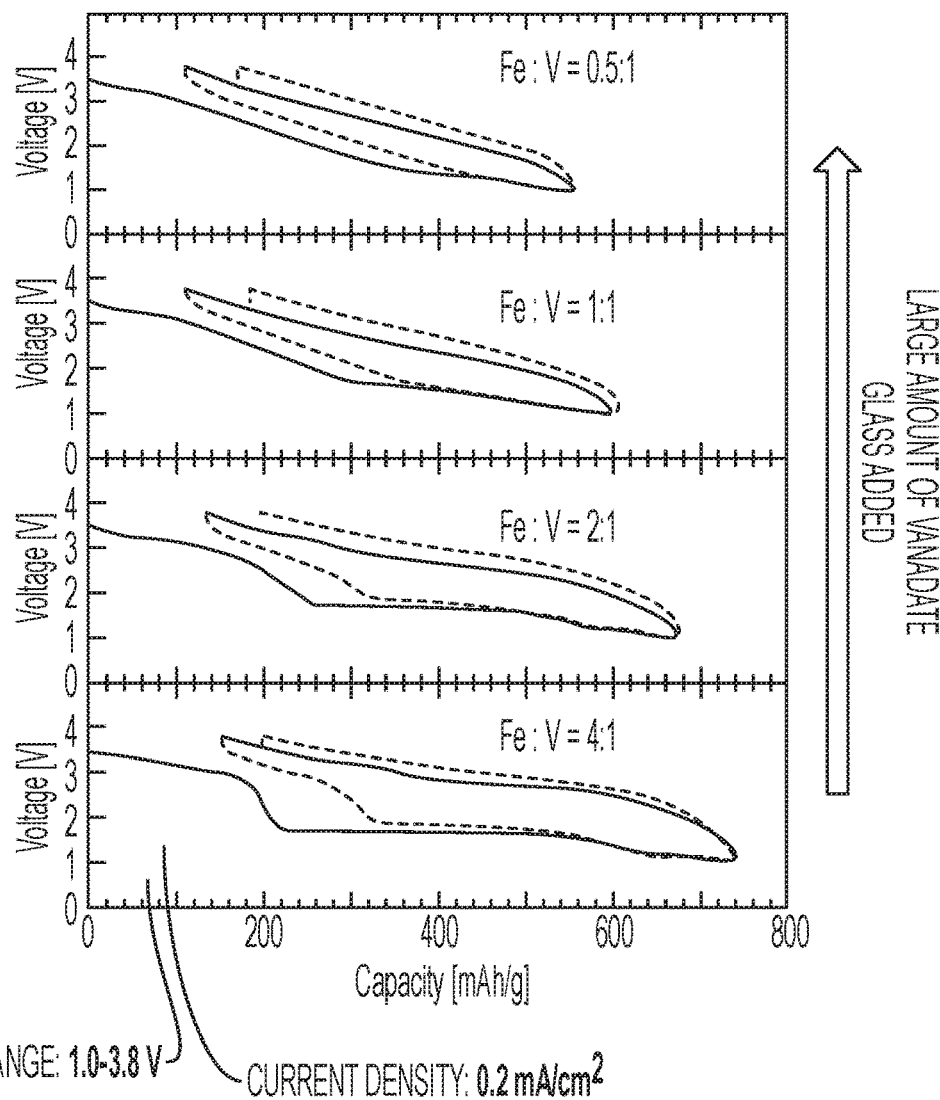
FIG. 6 shows a charge/discharge curve (Fe:V=0.5:1 to 4:1) of a positive electrode active substance according to an embodiment of the present invention.

FIG. 6 shows charge/discharge curves obtained by performing charge/discharge in the voltage range of 1.0 to 3.8 V on the condition of current density of 0.2 mA/cm$^2$ when the molar ratio Fe:V is 0.5:1, 1:1, 2:1, and 4:1 with respect to the positive electrode active substance of this Example (FeF$_3$—V$_2$O$_5$.P$_2$O$_5$ glass mixed positive electrode). From the obtained results, it was confirmed that the overvoltage decreased as the amount of vanadate glass (V$_2$O$_5$.P$_2$O$_5$ glass) added increased.

Figure 7A:
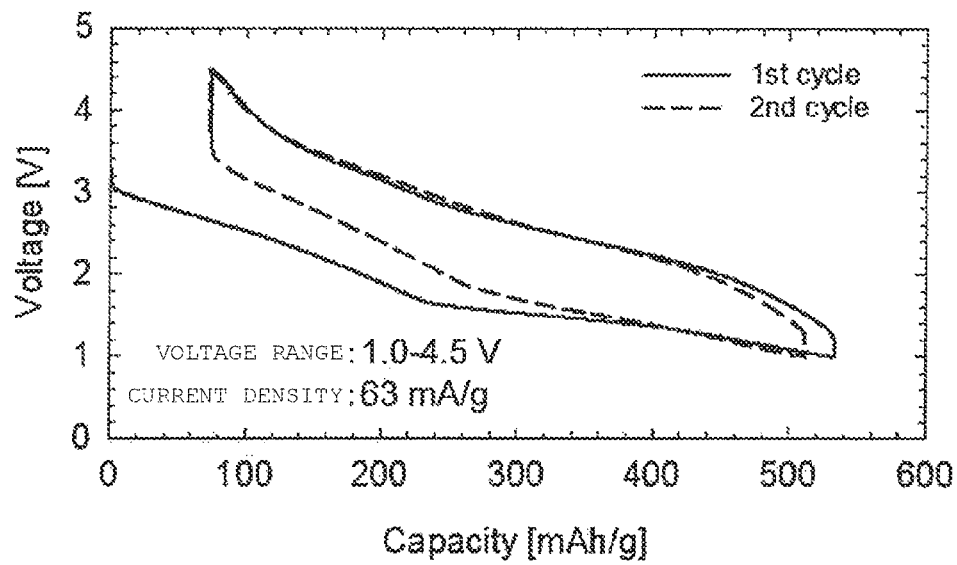
FIGS. 7A and 7B show charge/discharge curves of a positive electrode active substance (Fe:V=1:1) according to an embodiment of the present invention.
Figure 7B:
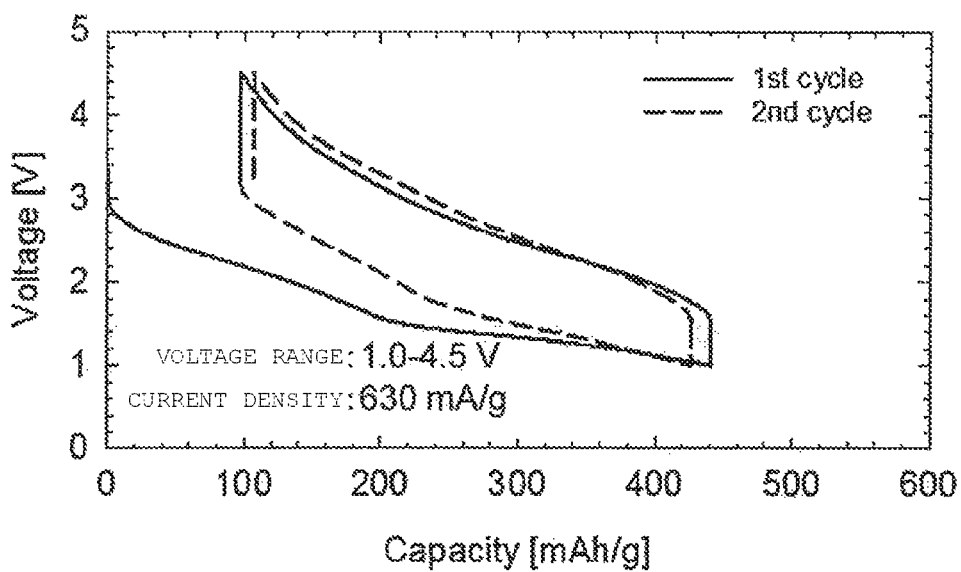

FIG. 7A shows a charge/discharge curve obtained by performing charge/discharge in the voltage range of 1.0 to 4.5 V on the condition of current density of 63 mA/g when the molar ratio Fe:V is 1:1 with respect to the positive electrode active substance of this Example (FeF$_3$—V$_2$O$_5$.P$_2$O$_5$ glass mixed positive electrode). Further, FIG. 7B shows a charge/discharge curve obtained under the same conditions and with a current density of 630 mA/g.

Figure 8A:
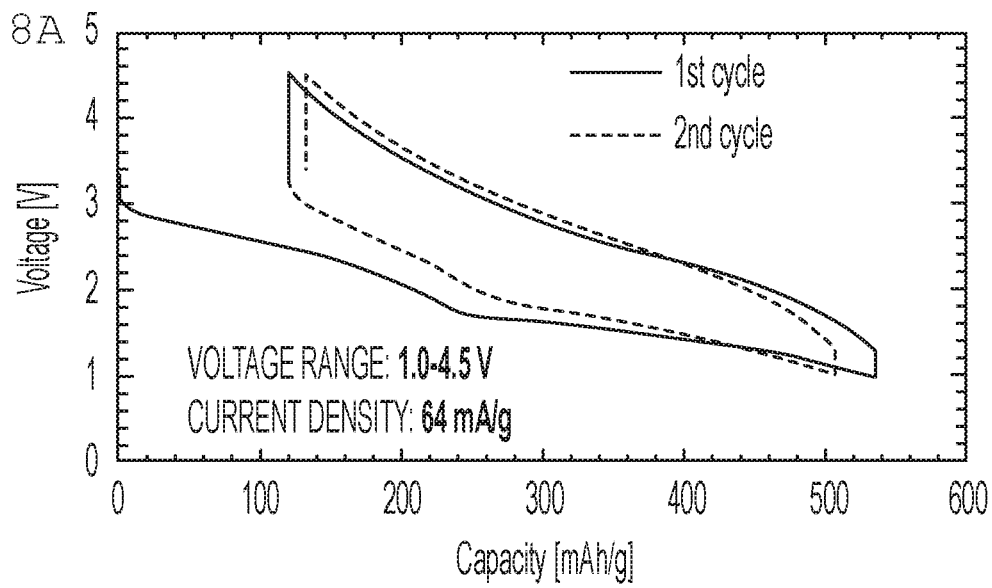
FIGS. 8A and 8B show charge/discharge curves of a positive electrode active substance (Fe:V=1.5:1) according to an embodiment of the present invention.
Figure 8B:
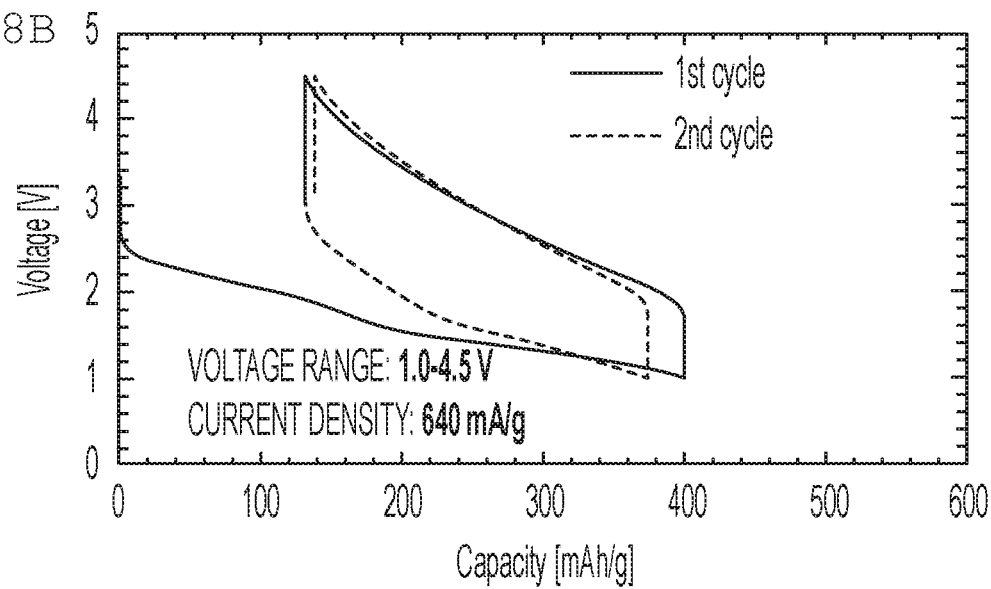

Further, FIG. 8A shows a charge/discharge curve obtained by performing charge/discharge in the voltage range of 1.0 to 4.5 V on the condition of current density of 64 mA/g when the molar ratio Fe:V is 1.5:1 with respect to the positive electrode active substance of this Example (FeF$_3$—V$_2$O$_5$.P$_2$O$_5$ glass mixed positive electrode). Further, FIG. 8B shows a charge/discharge curve obtained under the same conditions and with a current density of 640 mA/g.

From the results obtained in FIGS. 7 and 8, it was confirmed that even when the current density increased, the charge/discharge curves in the first cycle and the second cycle did not change greatly, that is, the rate characteristics were good. Further, from the results obtained in FIGS. 7 and 8, it was confirmed that the tendency of good rate characteristics did not change even when the amount of vanadate glass (V$_2$O$_5$.P$_2$O$_5$ glass) added was changed.

Hereinafter, the cycle characteristics of the positive electrode active substance of this example were confirmed.

Figure 9A:
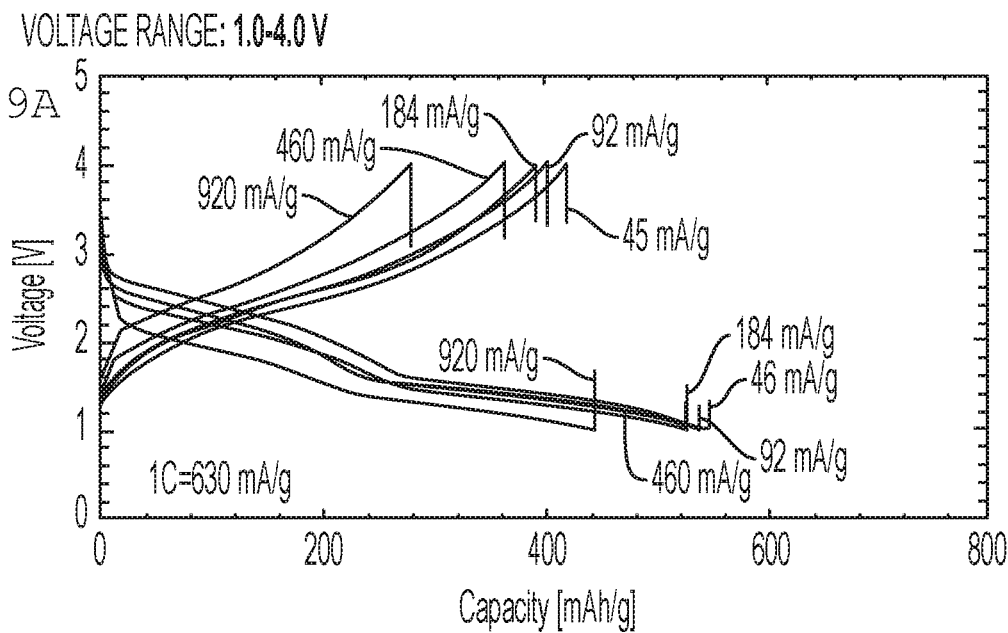
FIGS. 9A and 9B show charge/discharge curves and a cycle characteristic of a positive electrode active substance (Fe:V=1:1) according to an embodiment of the present invention, respectively.

FIG. 9A shows charge/discharge curves obtained by performing charge/discharge in the voltage range of 1.0 to 4.0 V on the condition of current density of 630 mA/g when the molar ratio Fe:V is 1:1 with respect to the positive electrode active substance of this Example (FeF$_3$—V$_2$O$_5$.P$_2$O$_5$ glass mixed positive electrode). That is, FIG. 9A shows charge/discharge characteristics obtained by performing charge/discharge in the voltage range of 1.0 to 4.0 V on the conditions of current density of 46 mA/g, 92 mA/g, 184 mA/g, 460 mA/g, and 920 mA/g.

Figure 9B:
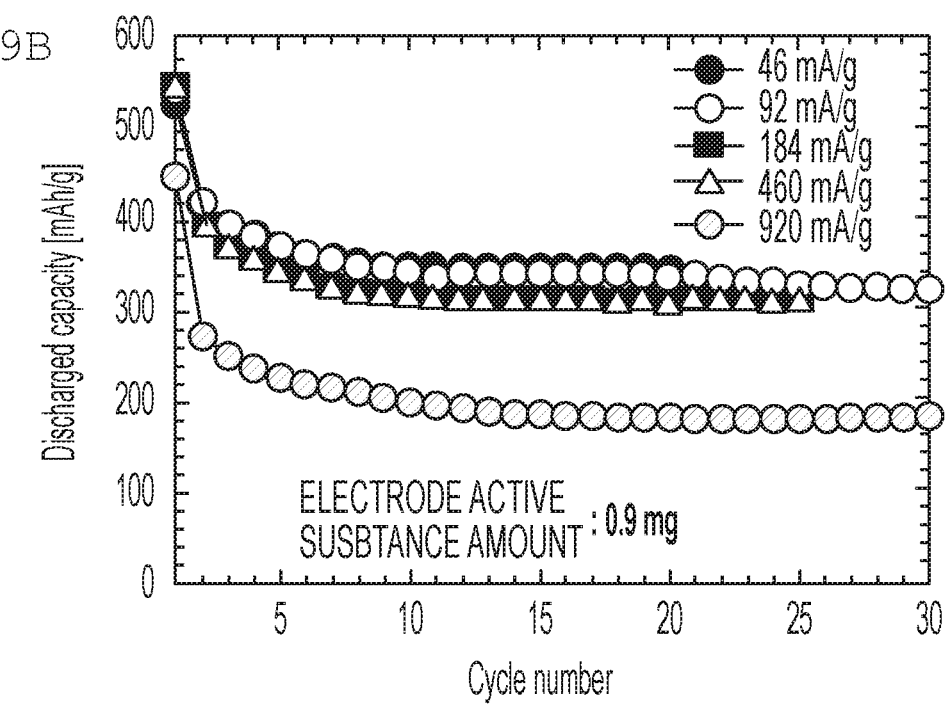
Figure 10A:
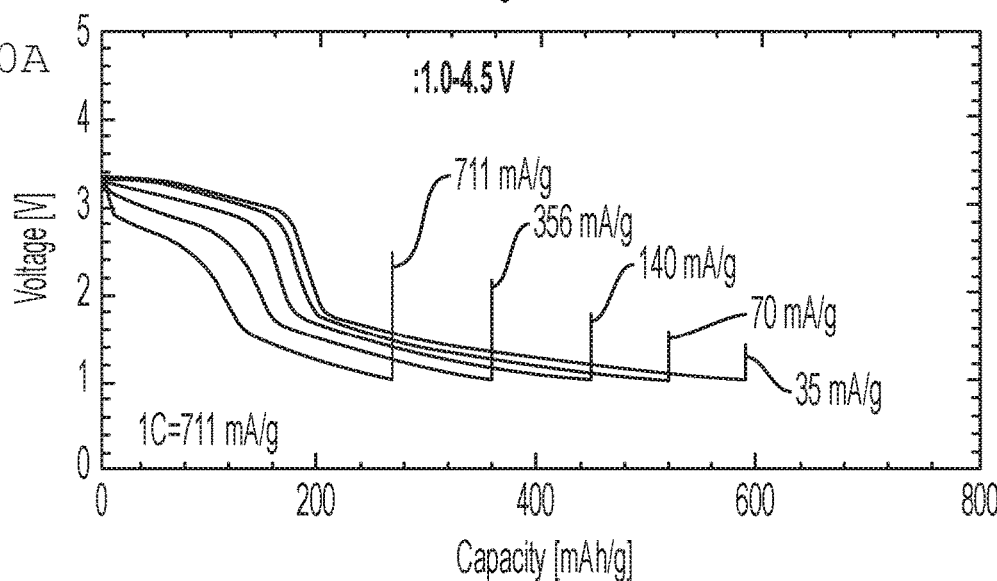
FIGS. 10A and 10B show charge/discharge curves and cycle characteristics of a positive electrode active substance ($FeF_3$) of the comparative example, respectively.
Figure 10B:
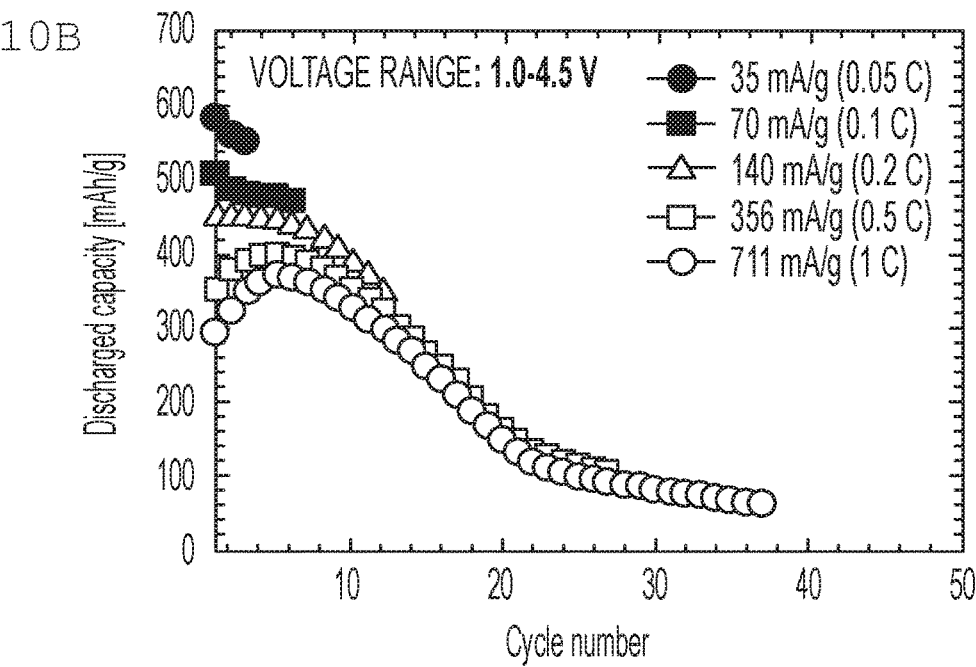

In addition, FIG. 9B shows the cycle characteristics (positive electrode active substance amount: 0.9 mg) obtained under these conditions. As the comparative example, FIGS. 10A and 10B show charge/discharge curves and cycle characteristics with respect to the positive electrode active substance FeF$_3$.

In the positive electrode active substance of this Example, as shown in FIG. 9, it was confirmed that the charge/discharge operations were able to be stably maintained even when the number of cycles exceeded 30 times. In contrast, in the conventional positive electrode active substance FeF$_3$, which is the comparative example, it was confirmed as shown in FIG. 10 that the charge/discharge operations were able to be maintained only when the number of cycles is less than 10 cycles.

Figure 11:
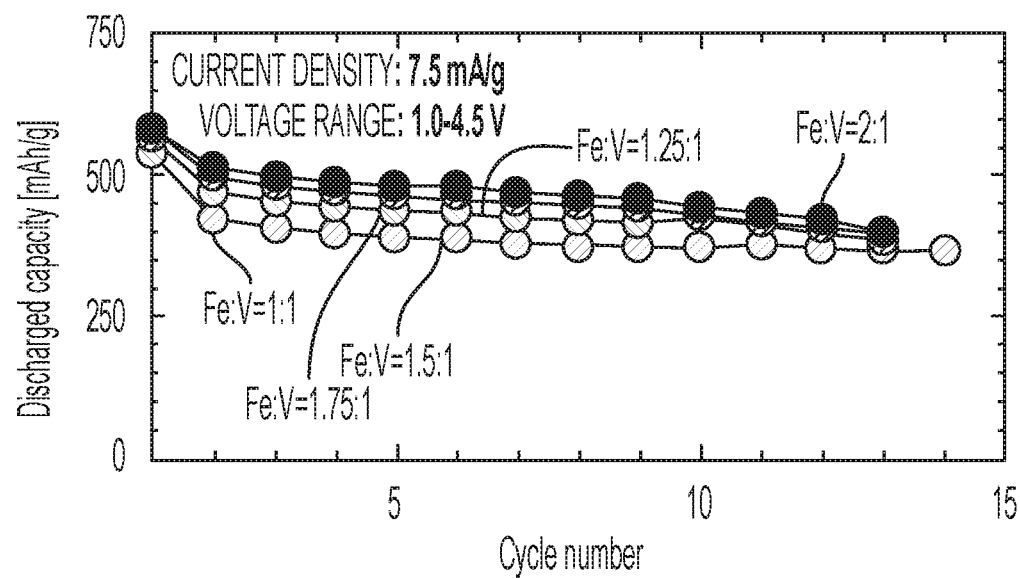
FIG. 11 shows a cycle characteristic of a positive electrode active substance (Fe:V=1:1 to 2:1) according to an embodiment of the present invention.

FIG. 11 shows cycle characteristics obtained by performing charge/discharge in the voltage range of 1.0 to 4.5 V on the condition of current density of 7.5 mA/g when the molar ratio Fe:V is 1:1, 1.25:1, 1.5:1, 1.75:1, and 2:1 with respect to the positive electrode active substance of this Example (FeF$_3$—V$_2$O$_5$.P$_2$O$_5$ glass mixed positive electrode). It was confirmed that while the positive electrode active substance of this Example exhibited the stable cycle characteristics in any molar ratio Fe:V, it exhibited the more stable cycle characteristics when the molar ratio Fe:V was 1:1.

Figure 12A:
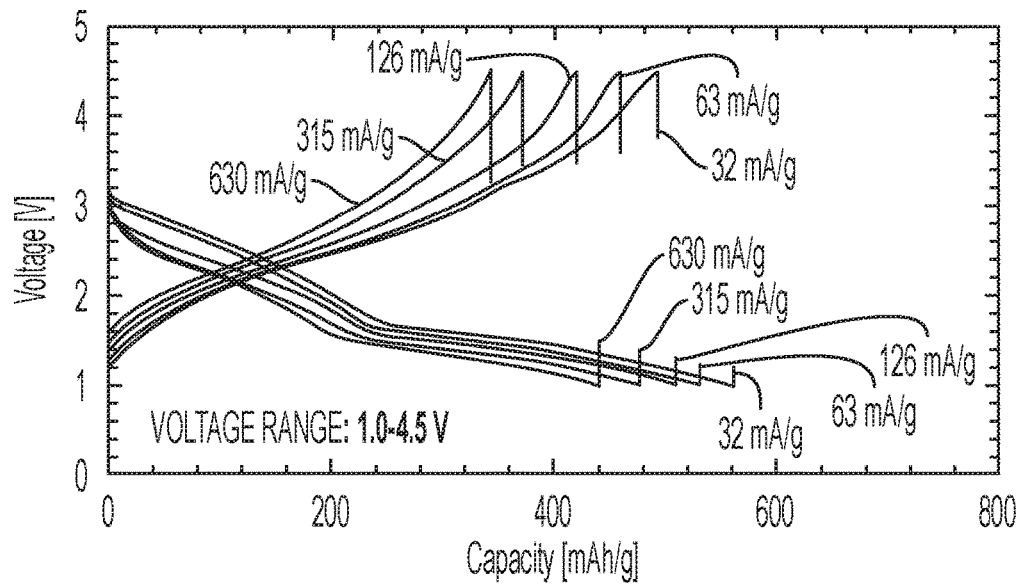
FIGS. 12A and 12B show a charge/discharge curve (voltage range: 1.0 to 4.5 V) and a cycle characteristic of a positive electrode active substance (Fe:V=1:1) according to embodiment of the present invention, respectively.
Figure 12B:
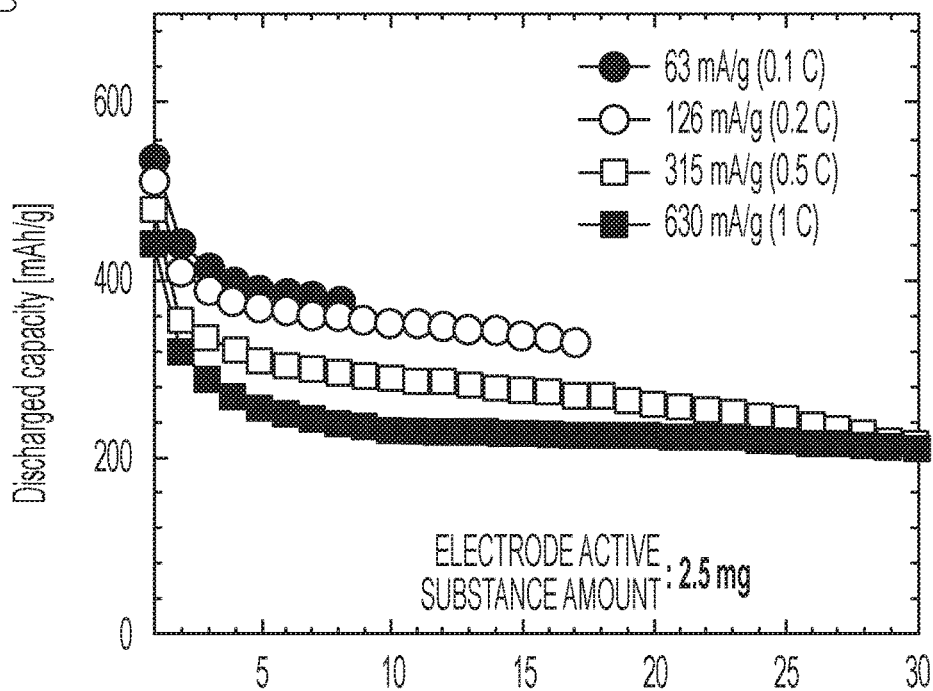

Further, FIG. 12A shows charge/discharge characteristics obtained by performing charge/discharge in the voltage range of 1.0 to 4.5 V on the conditions of current density of 32 mA/g, 63 mA/g, 126 mA/g, 315 mA/g, and 630 mA/g when the molar ratio Fe:V is 1:1 with respect to the positive electrode active substance of this Example (FeF$_3$—V$_2$O$_5$.P$_2$O$_5$ glass mixed positive electrode). In addition, FIG. 12B shows the cycle characteristics (positive electrode active substance amount: 2.5 mg) obtained under these conditions. It was confirmed that the positive electrode active substance of this Example exhibited stable cycle characteristics in any current density.

Figure 13A:
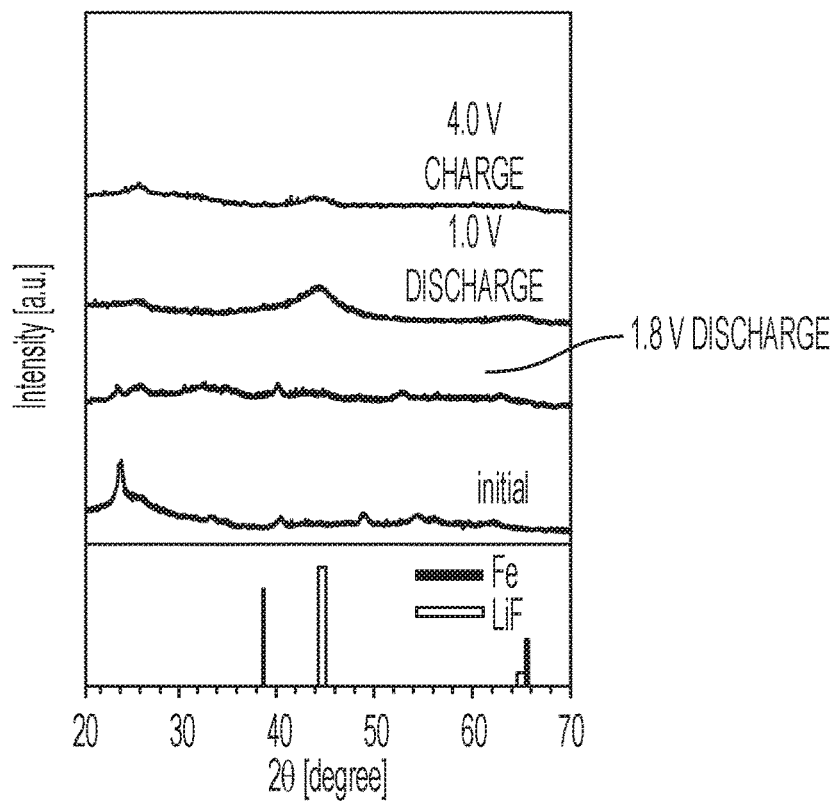
FIGS. 13A and 13B show an XRD result obtained after the charge/discharge reaction of a positive electrode active substance ($FeF_3$—$V_2O_5$.$P_2O_5$ glass mixed positive electrode) (Fe:V=1:1) according to an embodiment of the present invention, and an XRD result obtained after the charge/discharge reaction in the positive electrode active substance $FeF_3$ of the comparative example, respectively.
Figure 13B:
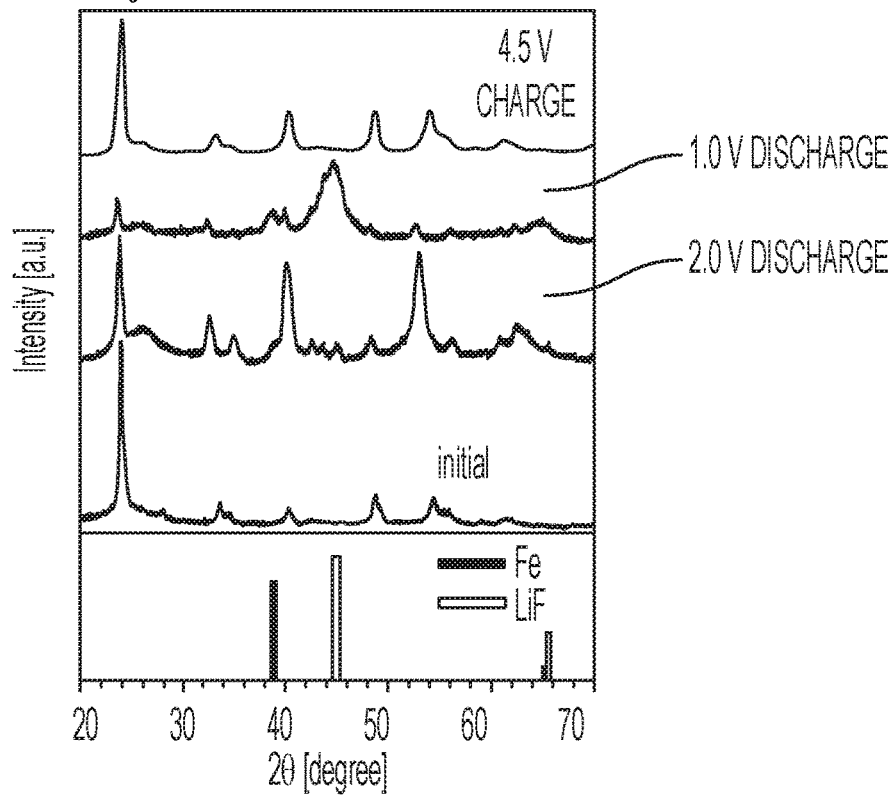

Next, FIG. 13A shows the XRD results obtained after the charge/discharge reaction (after 1.8 V discharge, 1.0 V discharge, and 4.0 V charge) when the molar ratio Fe:V is 1:1 with respect to the positive electrode active substance (FeF$_3$—V$_2$O$_5$.P$_2$O$_5$ glass mixed positive electrode) of this Example. As the comparative example, FIG. 13B shows the XRD results obtained after charge/discharge reactions (after 2.0 V discharge, 1.0 V discharge, and 4.5 V charge) with respect to the conventional positive electrode active substance FeF$_3$.

From the results obtained in FIG. 13A, in the positive electrode active substance of this Example (FeF$_3$—V$_2$O$_5$.P$_2$O$_5$ glass mixed positive electrode), the diffraction peak of metallic iron is broad, and the amorphousness was confirmed. In particular, almost no diffraction peak was observed after 4.0 V charge, and the amorphous state was confirmed. On the other hand, in the conventional positive electrode active substance $FeF_3$ of the comparative example, clear diffraction peaks of metallic iron were observed after 1.0 V discharge from the result obtained in FIG. 13B.

Figure 14A:
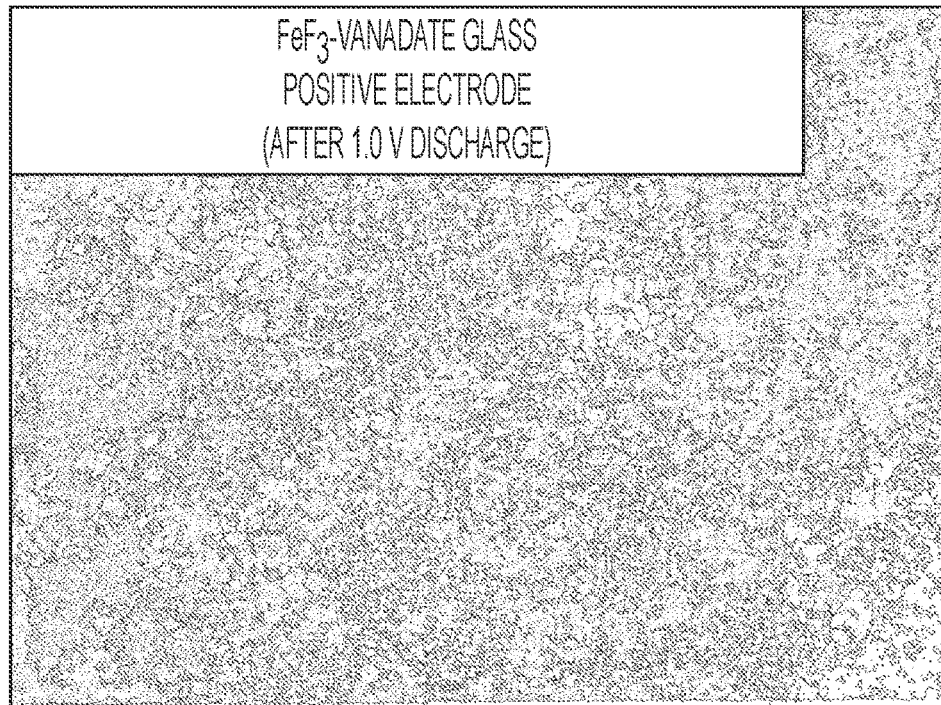
FIGS. 14A and 14B show a TEM-EDS analysis result after 1.0 V discharge of a positive electrode active substance $FeF_3$—$V_2O_5$.$P_2O_5$ glass mixed positive electrode) (Fe:V=1:1) according to an embodiment of the present invention, and a TEM-EDS analysis result after 1.0 V discharge in a positive electrode active substance $FeF_3$ of the comparative example, respectively.
Figure 14B:
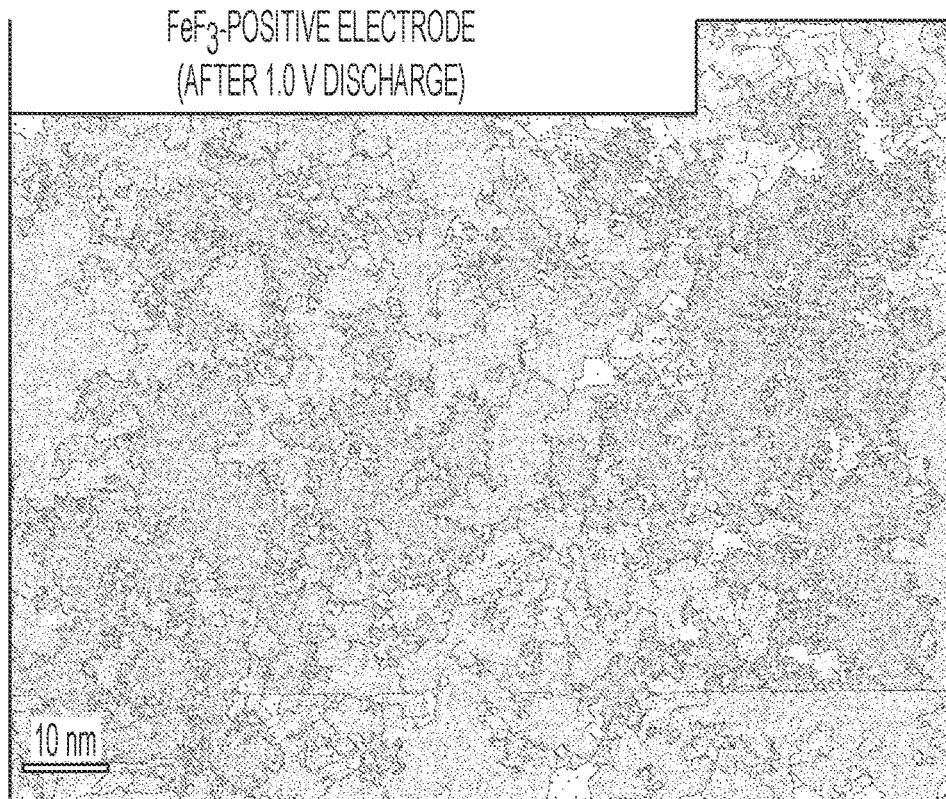

FIG. 14A shows the TEM-EDS analysis result after 1.0 V discharge with respect to the positive electrode active substance ($FeF_3$—$V_2O_5.P_2O_5$ glass mixed positive electrode) (Fe:V=1:1) of this Example. As the comparative example, FIG. 14B shows the TEM-EDS analysis result after 1.0 V discharge of the conventional positive electrode active substance $FeF_3$.

From the obtained results, in the positive electrode active substance ($FeF_3$—$V_2O_5.P_2O_5$ glass mixed positive electrode) of this Example, the presence of amorphous metallic iron was confirmed as shown in FIG. 14A.

That is, as described above with reference to FIG. 1A which schematically illustrates FIG. 14A, a plurality of positive electrode active substances according to the present invention is present as grains constituting the positive electrode, and the grains are carried by a binder. It was confirmed that the respective positive electrode active substances were configured with the grains of the metal compound $FeF_3$ dispersed in the glassy amorphous metal oxide $V_2O_5.P_2O_5$.

In other words, it was confirmed that the grains of the metal compound $FeF_3$ are dispersed as secondary grains in the glassy amorphous metal oxide $V_2O_5.P_2O_5$ in each grain of the positive electrode active substance.

On the other hand, in the positive electrode active substance $FeF_3$ of the comparative example, the presence of highly crystalline metallic iron was confirmed as shown in FIG. 14B. That is, unlike the conventional example, in the positive electrode active substance of this Example, it is conceived that the crystallinity of metallic iron generated after discharge is reduced due to the vanadate glass ($V_2O_5.P_2O_5$ glass) added, and the reverse reaction of LiF and Fe, which proceeds by the charge reaction, is easier to proceed than that of the conventional example.

EXAMPLES 3

In the same manner as in Example 1 above, the $V_2O_5.P_2O_5$ glass ($90V_2O_5$-$10P_2O_5$), which is the amorphous metal oxide $V_2O_5$, was obtained.

A mixture of the metal compound $FeF_3$ (produced by Wako Pure Chemical Corporation) and the alkali metal salt $Li_2O$ (produced by Wako Pure Chemical Corporation) was placed in a planetary ball mill container in which atmosphere can be controlled, and was sealed together with 40 g of zirconia balls with a diameter of 3 mm in an argon atmosphere. In this container, the mixture was mixed and pulverized for 24 hours with a ball mill (pulverisette 7, produced by Fritsch) under the condition of 600 rpm.

This mixture and the $V_2O_5.P_2O_5$ glass obtained above were weighed and mixed so that the molar ratio was Fe/V=1.00. The mixture was placed in a planetary ball mill container capable of controlling the atmosphere, and sealed together with 40 g of zirconia balls having a diameter of 3 mm in an argon atmosphere. In this container, the mixture was mixed and pulverized for hours with a ball mill (pulverisette 7, produced by Fritsch) under the condition of 600 rpm, furthermore, 5 wt % acetylene black (HS-100, produced by Denka Company. Limited) was added, and the mixture was further mixed and pulverized by the ball mill for one hour under the condition of 200 rpm. Further, 20 wt % acetylene black (HS-100, produced by Denka Company Limited) was added, and further mixed and pulverized by the ball mill for two hours under the condition of 200 rpm to obtain the positive electrode active substance ($FeF_3.Li_2O$—$V_2O_5$. $P_2O_5$ glass mixed positive electrode).

Figure 15:
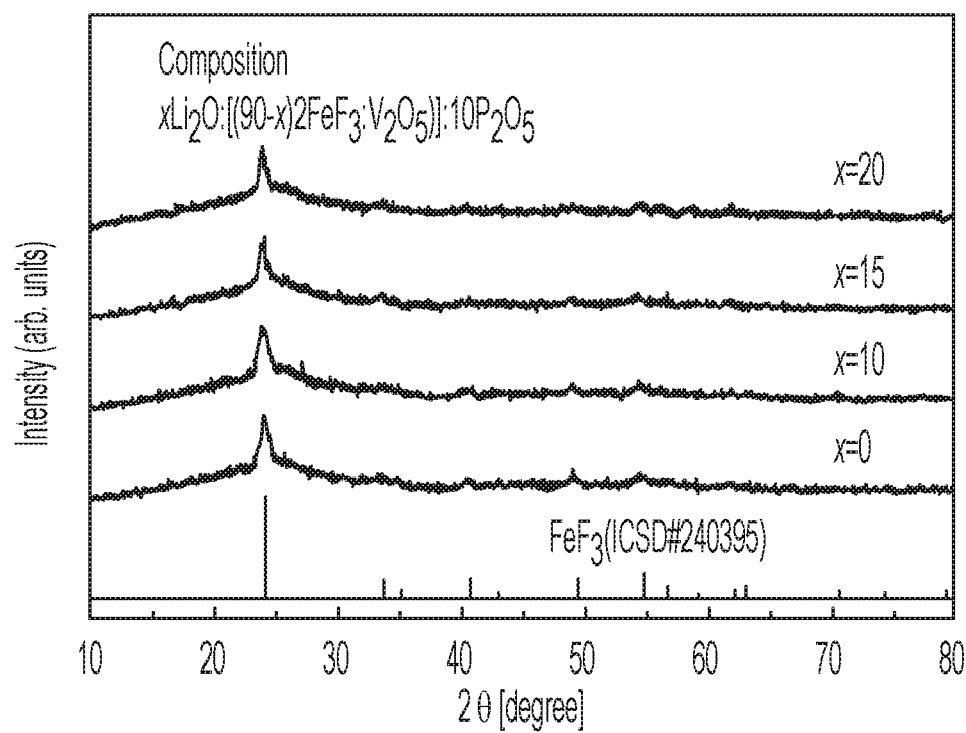
FIG. 15 shows an XRD pattern result of a positive electrode active substance ($FeF_3$.$Li_2O$—$V_2O_5$.$P_2O_5$ glass mixed positive electrode) (Fe:V=1:1) according to an embodiment of the present invention.

The X-ray diffraction measurement was performed on the positive electrode active substance for a non-aqueous secondary battery obtained above in the same manner as in Example 1. FIG. 15 shows the XRD pattern of $FeF_3.Li_2O$—$V_2O_5.P_2O_5$ glass mixed positive electrode $FeF_3$-$xLi_2O$-(90-x) $V_2O_5$-$10P_2O_5$ (x=0 to 20), which is a positive electrode active substance for a non-aqueous secondary battery. In addition to the XRD peak obtained from the ICDD data of iron fluoride (FeF3) shown as a reference a broad halo peak showing amorphous property was confirmed in the XRD pattern of the obtained positive electrode active substance.

Figure 16A:
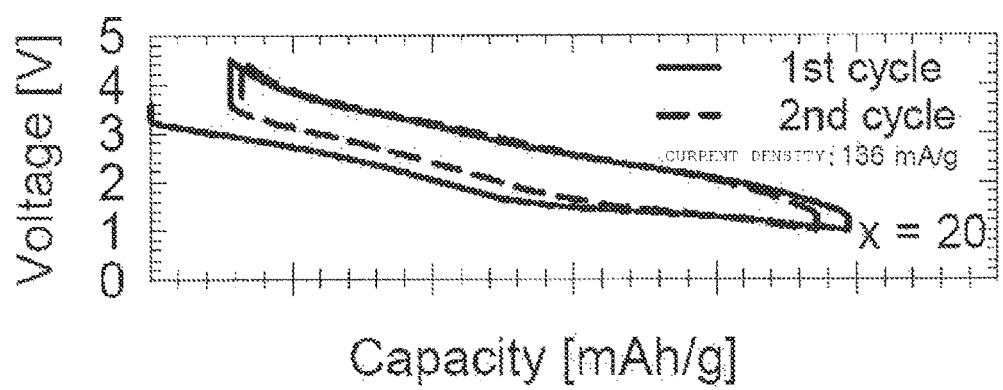
FIGS. 16A and 16B show charge/discharge curves of a positive electrode active substance ($FeF_3$.$Li_2O$—$V_2O_5$.$P_2O_5$ glass mixed positive electrode) (Fe:V=1:1) according to an embodiment of the present invention.
Figure 16B:
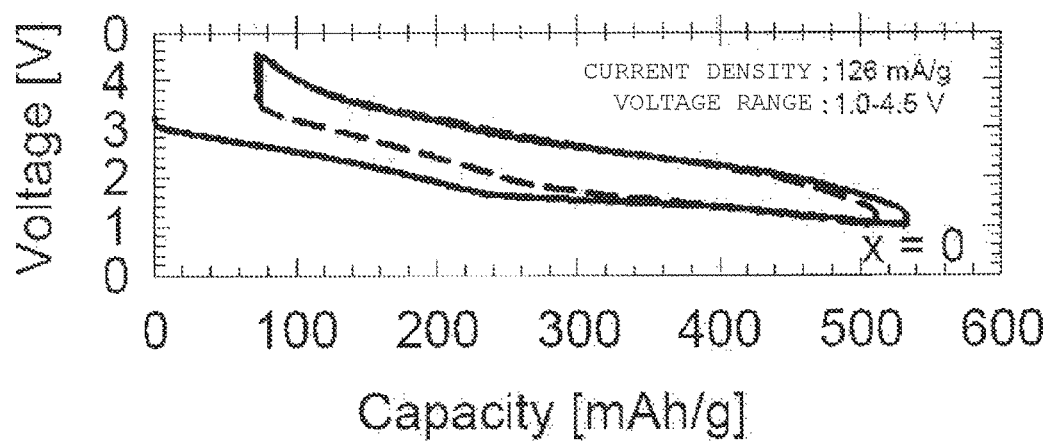

In FIG. 16, FIG. 16A shows the result when the blending molar ratio of the alkali metal salt $Li_2O$ is 20% (x=20), and FIG. 16B shows the result when $Li_2O$ is not blended (x=0) for the charge/discharge curve obtained by charging/discharging in the voltage range of 1.0 to 5.0 V under the condition of current density of 0.2 mA/cm$^2$ with respect to the $FeF_3$—$V_2O_5$. $P_2O_5$ glass mixed positive electrode [$FeF_3$-$xLi_2O$-(90-x) $V_2O_5$-$10P_2O_5$], which is the positive electrode active substance of this Example. From the obtained results, it was confirmed that the irreversible capacitance decreased as the addition amount of the alkali metal salt $Li_2O$ increased.

EXAMPLE 4

In the same manner as in Example 1 above, the $V_2O_5.P_2O_5$ glass ($90V_2O_5$-$10P_2O_5$), which is the amorphous metal oxide $V_2O_5$, was obtained.

Figure 17:
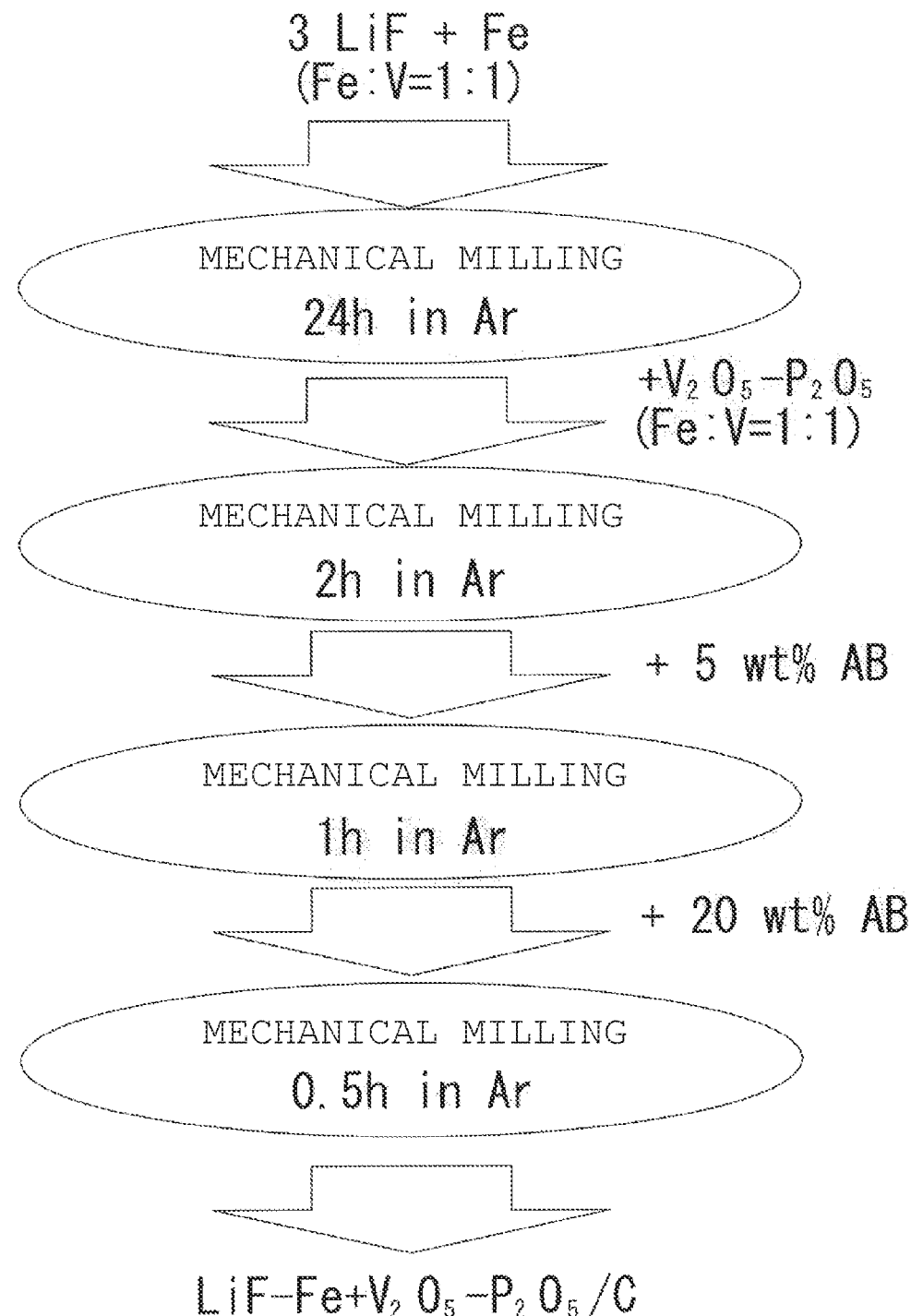
FIG. 17 shows a method of preparing a positive electrode active substance (LiF.Fe—$V_2O_5$.$P_2O_5$ glass mixed positive electrode) according to an embodiment of the present invention.

As shown in FIG. 17, first, a mixture of LiF (produced by Wako Pure Chemical Corporation) and metallic iron (Fe) (produced by Wako Pure Chemical Corporation) was placed in a planetary ball mill container in which atmosphere can be controlled, and was sealed together with 40 g of zirconia halls with a diameter of 3 mm in an argon atmosphere. In this container, the mixture was mixed and pulverized for 24 hours with a ball mill (pulverisette 7, produced by Fritsch) under the condition of 600 rpm.

This mixture and the $V_2O_5.P_2O_5$ glass obtained above were weighed and mixed so that the molar ratio was Fe/V=1.00. The mixture was placed in a planetary ball mill container capable of controlling the atmosphere, and sealed together with 40 g of zirconia balls having a diameter of 3 mm in an argon atmosphere. In this container, the mixture was mixed and pulverized for 2 hours with a ball mill (pulverisette 7, produced by Fritsch) under the condition of 600 rpm, furthermore, 5 wt % acetylene black (HS-100, produced by Denka Company Limited) was added, and the mixture was further mixed and pulverized by the ball mill for one hour under the condition of 200 rpm. Further, 20 wt % acetylene black (HS-100, produced by Denka Company Limited) was added, and further mixed and pulverized by the ball mill for two hours under the condition of 200 rpm to obtain the positive electrode active substance LiF.Fe—$V_2O_5.P_2O_5$ glass mixed positive electrode). This positive electrode active substance (LiF.Fe—$V_2O_5.P_2O_5$ glass mixed positive electrode) was confirmed to have a broad halo peak exhibiting amorphous properties from the obtained XRD pattern.

Further, as the comparative example, the positive electrode active substance containing no glass (LiF.Fe mixed positive electrode) was produced in the same manner. That is, first, a mixture of LiF (produced by Wako Pure Chemical Corporation) and metallic iron (Fe) (produced by Wako Pure Chemical Corporation) was placed in a planetary ball mill container in which atmosphere can be controlled, and was sealed together with 40 g of zirconia balls with a diameter of 3 mm in an argon atmosphere. In this container, the mixture was mixed and pulverized for 72 hours with the ball mill (pulverisette 7, produced by Fritsch) under the condition of 600 rpm. The mixture was placed in a planetary ball mill container capable of controlling the atmosphere, and sealed together with 40 g of zirconia balls having a diameter of 3 mm in an argon atmosphere. In this container, 5 wt % acetylene black (HS-100, produced by. Denka Company Limited) was further added, and mixed and pulverized for 24 hours with a ball mill (pulverisette 7, produced by Fritsch) under the condition of 600 rpm. Further, 20 wt % acetylene black (HS-100, produced by Denka Company Limited) was added, and further mixed and pulverized by the ball mill for 3 hours under the condition of 200 rpm to obtain a positive electrode active substance containing no glass (LiF.Fe mixed positive electrode).

Using this positive electrode active substance (LiF.Fe—$V_2O_5$.$P_2O_5$ glass mixed positive electrode), the non-aqueous secondary battery including the lithium metal negative electrode is produced in the same procedure and configuration as in Example 2 except for the positive electrode active substance. As the comparative example, the non-aqueous secondary battery including the lithium metal negative electrode was similarly produced for the positive electrode active substance containing no glass (LiF.Fe mixed positive electrode) obtained above.

The non-aqueous secondary battery was subjected to a charge/discharge test in a constant current mode at 25° C. Specifically, first, the battery was discharged to 1.0 V under the condition of current density of 0.2 mA/cm$^2$, and then charged in a constant current mode with 4.5 V as the upper limit. The battery was discharged to 1.0 V, and the obtained capacitance was defined as the discharge capacitance.

FIG. 18A is the obtained charge/discharge curve. For comparison, the charge/discharge curve of the positive electrode active substance containing no glass (LiF.Fe mixed positive electrode) was also checked to obtain the result of FIG. 18B. From this result, it was confirmed that the positive electrode active substance of this Example was capable of suppressing a large voltage drop during discharge in addition to the overvoltage reduction during charge, as compared with the positive electrode active substance containing no glass (LiF.Fe mixed positive electrode).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A positive electrode active substance for a non-aqueous secondary battery, comprising:
   a metal or a metal compound including a metal element $M^1$ that exhibits a conversion reaction and/or a reverse conversion reaction; and
   an amorphous metal oxide of a metal element $M^2$,
   wherein the metal element $M^2$ includes at least one metal element selected from the group consisting of V, Cr, Mo, Mn, Ti, and Ni,
   wherein the metal $M^1$ includes at least one metal element selected from the group consisting of Fe, Ti, Co, Bi, Mn and V,
   wherein the metal compound includes $M^1aXb$,
   wherein X includes fluorine, oxygen, chlorine, $PO_4$ phosphate group, $SO_4$ sulfate group, $SiO_4$ silicate group, $CO_3$ carbonate group, or $NO_3$ nitrate group, and a and b are integers,
   wherein the amorphous metal oxide of the metal element $M^2$ includes a glassy amorphous metal oxide, and
   wherein grains of the metal compound $M^1aXb$ are dispersed in the glassy amorphous metal oxide of the metal element $M^2$.

2. The positive electrode active substance according to claim 1, further comprising:
   an alkali metal salt AcXd,
   wherein A represents Li or Na, X represents fluorine, oxygen, chlorine, $PO_4$ phosphate group, $SO_4$ sulfate group, $SiO_4$ silicate group, $CO_3$ carbonate group, or $NO_3$ nitrate group, and c and d are integers.

3. The positive electrode active substance according to claim 2, wherein the alkali metal salt AcXd includes $Li_2O$, LiF, NaF or $Li_3PO_4$.

4. The positive electrode active substance according to claim 1, wherein
   the metal compound $M^1aXb$ includes $FeF_3$.

5. The positive electrode active substance according to claim 4, wherein
   the amorphous metal oxide of the metal element $M^2$ includes $V_2O_5$.

6. The positive electrode active substance according to claim 5, wherein
   the amorphous metal oxide of the metal element $M^2$ includes a compound configured to serve as a network former.

7. The positive electrode active substance according to claim 6, wherein
   the compound configured to serve as the network former includes at least one selected from the group consisting of $P_2O_5$, $SiO_2$, and $B_2O_3$.

8. The positive electrode active substance according to claim 1, wherein
   the positive electrode active substance is configured to be subjected to a carbon coating treatment.

9. A non-aqueous secondary battery comprising:
   a positive electrode including the positive electrode active substance according to claim 1.

10. The non-aqueous secondary battery according to claim 9, further comprising:
    a negative electrode including a graphite, a metallic lithium, or a lithium titanium oxide.

* * * * *